United States Patent
Hu et al.

(10) Patent No.: US 12,165,328 B2
(45) Date of Patent: *Dec. 10, 2024

(54) SYSTEMS AND METHODS FOR IMAGE RECONSTRUCTION AND PROCESSING

(71) Applicant: SHANGHAI UNITED IMAGING HEALTHCARE CO., LTD., Shanghai (CN)

(72) Inventors: Debin Hu, Shanghai (CN); Yong Zhao, Shanghai (CN); Yang Lyu, Shanghai (CN); Yizhang Zhao, Shanghai (CN); Liuchun He, Shanghai (CN); Yinghan Qu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,735

(22) Filed: Jun. 26, 2023

(65) Prior Publication Data

US 2023/0342939 A1 Oct. 26, 2023

Related U.S. Application Data

(63) Continuation of application No. 17/134,570, filed on Dec. 28, 2020, now Pat. No. 11,688,071.

(30) Foreign Application Priority Data

Mar. 19, 2020 (CN) .......................... 202010194713.1
Mar. 19, 2020 (CN) ............................ 202010194722.

(51) Int. Cl.
*G06T 7/00* (2017.01)
*G06N 20/00* (2019.01)
(Continued)

(52) U.S. Cl.
CPC ................ *G06T 7/11* (2017.01); *G06N 20/00* (2019.01); *G06T 7/0012* (2013.01); *G06V 10/25* (2022.01);
(Continued)

(58) Field of Classification Search
CPC ..................... G06T 7/11; G06T 7/0012; G06T 2207/30048; G06T 2207/30101;
(Continued)

(56) References Cited

U.S. PATENT DOCUMENTS 5,212,717 A 5/1993 Hada
11,516,719 B1 * 11/2022 Sung ................... H04W 36/304
(Continued)

FOREIGN PATENT DOCUMENTS

CN 101190131 A 6/2008
CN 106073812 A 11/2016
(Continued)

OTHER PUBLICATIONS

Ye, Yangbo et al., A General Local Reconstruction Approach Based on a Truncated Hilbert Transform, International Journal of Biomedical Imaging, 2007, 8 pages.
(Continued)

*Primary Examiner* — Khai M Nguyen
(74) *Attorney, Agent, or Firm* — METIS IP LLC

(57) ABSTRACT

The present disclosure provides a system and method for image reconstruction and processing. The method may include obtaining image data of an object acquired by an imaging device. The method may include determining one or more regions of interest (ROIs) of the object. The method may also include determining, based on each ROI of the one or more ROIs, a target portion of the image data corresponding to the ROI among the image data. The method may
(Continued)

further include reconstructing, based on the target portion of the image data, one or more images of the ROI.

20 Claims, 10 Drawing Sheets

(51) Int. Cl.
| | | |
|---|---|---|
| *G06T 7/11* | (2017.01) | |
| *G06V 10/25* | (2022.01) | |
| *G06V 10/44* | (2022.01) | |
| *G06V 10/764* | (2022.01) | |
| *G06V 10/774* | (2022.01) | |

(52) U.S. Cl.
CPC .......... *G06V 10/454* (2022.01); *G06V 10/764* (2022.01); *G06V 10/774* (2022.01); *G06T 2207/30048* (2013.01); *G06T 2207/30101* (2013.01)

(58) Field of Classification Search
CPC ...... G06N 20/00; G06V 10/25; G06V 10/454; G06V 10/774; G06V 10/764
See application file for complete search history.

(56) References Cited

U.S. PATENT DOCUMENTS

| | | |
|---|---|---|
| 2009/0175562 A1 | 7/2009 | Pan et al. |
| 2010/0119033 A1 | 5/2010 | Li et al. |
| 2014/0163403 A1 | 6/2014 | Lenox et al. |
| 2015/0036789 A1 | 2/2015 | Panin et al. |
| 2016/0163042 A1* | 6/2016 | Wollenweber ........ G01T 1/2985 382/131 |
| 2016/0203599 A1 | 7/2016 | Gillies et al. |
| 2019/0139223 A1 | 5/2019 | Nie et al. |
| 2019/0206051 A1* | 7/2019 | Cao ..................... A61B 5/0037 |
| 2020/0170605 A1 | 6/2020 | Qi et al. |
| 2020/0345322 A1* | 11/2020 | Bai ...................... A61B 6/4266 |
| 2021/0279917 A1* | 9/2021 | Wilk .................... A61B 6/5282 |
| 2022/0022834 A1* | 1/2022 | Nehmeh ................. A61B 6/54 |
| 2022/0343496 A1* | 10/2022 | Zhang ................. G06V 30/194 |

FOREIGN PATENT DOCUMENTS

| | | |
|---|---|---|
| CN | 108320793 A | 7/2018 |
| CN | 110568470 A | 12/2019 |
| CN | 110680366 A | 1/2020 |
| JP | 2006326078 A | 12/2006 |
| WO | 2006006096 A1 | 1/2006 |

OTHER PUBLICATIONS

Yu, Hengyong et al., Compressed Sensing Based Interior Tomography, Physics in Medicine and Biology, 54: 2791-2805, 2009.

Katsevich, Alexander, Cone Beam Local Tomography, SIAM Journal on Applied Mathematics, 59(6): 2224-2246, 1999.

Zhang, Jie et al., Exact and Stable Interior ROI Reconstruction for Radial MRI, Medical Imaging 2009: Physics of Medical Imaging, 7258: 72585G-1-72585G-8, 2009.

Gengsheng L. Zeng et al., SPECT Region of Interest Reconstruction with Truncated Transmission and Emission Data, Medical physics, 37(9): 4627-4633, 2010.

\* cited by examiner

SYSTEMS AND METHODS FOR IMAGE RECONSTRUCTION AND PROCESSING

CROSS-REFERENCE TO RELATED APPLICATIONS

This application is a Continuation of U.S. application Ser. No. 17/134,570 filed on Dec. 28, 2020, which claims priority of Chinese Patent Application No. 202010194713.1 filed on Mar. 19, 2020, and Chinese Patent Application No. 202010194722.0 filed on Mar. 19, 2020, the contents of each of which are hereby incorporated by reference.

TECHNICAL FIELD

The disclosure generally relates to image processing, and more particularly relates to systems and methods for image reconstruction and processing for imaging devices with a long axial field of view (AFOV).

BACKGROUND

Since a scanning range of an imaging device, e.g., a positron emission tomography (PET) device, with a longer axial field of view (AFOV) is much larger than that of an imaging device (e.g., with a shorter AFOV), the imaging device with the longer AFOV is more and more popular for medical diagnosis and/or treatment. Moreover, the amount of imaging data acquired by the imaging device with the longer AFOV in a same scanning time is much larger than that obtained by an imaging device with a shorter AFOV. However, when images of a specific region (e.g., the head, a liver, etc.) of an object (e.g., a patient) are needed for medical diagnosis and/or treatment, image data of the object obtained by an imaging device with the longer AFOV may include data of other regions except for the specific region, which increases radiation dose received by the object, results in storage redundancy, thereby decreasing speed and accuracy of image processing (e.g., image reconstruction, determination of a plasma input function based on reconstructed images, etc.). Thus, it is desired to provide systems and methods for image reconstruction and processing with improved efficiency and accuracy.

SUMMARY

According to a first aspect of the present disclosure, a system is provided. The system may include at least one storage device storing executable instructions, and at least one processor in communication with the at least one storage device. When executing the executable instructions, the at least one processor may cause the system to perform one or more of the following operations. The system may obtain image data of an object acquired by an imaging device. The system may determine one or more regions of interest (ROIs) of the object. The system may also determine, based on each ROI of the one or more ROIs, a target portion of the image data corresponding to the ROI among the image data. The system may further reconstruct, based on the target portion of the image data, one or more images of the ROI.

In some embodiments, the imaging device may include a plurality of detector rings arranged along an axial direction of the imaging device. Each of the plurality of detector rings may include detecting units arranged along a radial direction of the imaging device. The image data may relate to multiple lines of response (LORs). Each of the LORs may be associated with two detector units that are located two sides of the axial direction. The target portion of the image data may correspond to the ROI relates to target LORs among the multiple LORs that traverse a reconstructed axial field of view (AFOV) of the ROI.

In some embodiments, the determining, based on each ROI of the one or more ROIs, a target portion of the image data may include determining, based on position information of the ROI, the reconstructed AFOV of the ROI; determining, based on the reconstructed AFOV of the ROI, a first detector ring corresponding to a starting position of the reconstructed AFOV and a second detector ring corresponding to an ending position of the reconstructed AFOV; and determining, based on the first detector ring and the second detector ring, the target LORs that traverse the reconstructed AFOV of the ROI.

In some embodiments, each of the LORs may connect detecting units in detector rings that are arranged between the first detector ring and the second detector ring.

In some embodiments, the reconstructing, based on the target portion of the image data, one or more images of the ROI may further include obtaining reference image data of the ROI; reconstructing, based on the reference image data, one or more reference images; generating one or more attenuation images based on the one or more reference images; and performing an attenuation correction on the target portion of the image data based on the one or more attenuation images.

In some embodiments, each of the plurality of detector rings may be identified with a serial number. The determining, based on the reconstructed AFOV of the ROI, a first detector ring corresponding to a starting position of the reconstructed AFOV and a second detector ring corresponding to an ending position of the reconstructed AFOV may include determining, based on the starting position and a width of a detector ring, a first serial number of the first detector ring; and determining, based on the ending position and the width of the detector ring, a second serial number of the second detector ring.

In some embodiments, each of the LORs may connect detecting units in detector rings with a third serial number and a fourth serial number. The third serial number and the fourth serial number may satisfy a condition including that the third serial number and the fourth serial number are in a range from the first serial number to the second serial number, or the third serial number is less than the first serial number and the fourth serial number exceeds the first serial number, or the third serial number is less than the second serial number and the fourth serial number exceeds the second serial number.

In some embodiments, the reconstructing, based on the target portion of the image data, one or more images of the ROI may further include determining, based on the reconstructed AFOV of the ROI, an axial dimensionality of the one or more images; and reconstructing, based on the target portion of the image data and the axial dimensionality, the one or more images of the ROI.

In some embodiments, the reconstructing, based on the target portion of the image data, one or more images of the ROI may further include performing a correction operation on the target portion of the image data. The correction operation may include at least one of a normalized correction, a scattering correction, or a random correction.

In some embodiments, the reconstructing, based on the target portion of the image data, one or more images of the ROI may further include generating the one or more images by performing an iterative reconstruction or an analytical reconstruction on the target portion of the image data.

In some embodiments, the one or more images may include dynamic images of the ROI. The operations may further include determining, based on the one or more dynamic images of the ROI, a plasma input function.

In some embodiments, the determining, based on the one or more dynamic images of the ROI, a plasma input function may include for each of the one or more dynamic images, determining a target region from the ROI represented in the dynamic image, the target region representing a blood pool; for each of the one or more dynamic images, determining a certain value based on pixel values in the target region; and determining, based on certain values corresponding to the one or more dynamic images, the plasma input function.

In some embodiments, the determining a target region from the ROI represented in the dynamic image, the target region representing a blood pool may further include obtaining one or more reference images representing the ROI; determining the target region represented in each of the one or more reference images; and matching each of the one or more reference images with one of the one or more dynamic images to determine the target region represented in the image.

In some embodiments, the determining a target region from the ROI represented in the image may further include determining a reference image from the one or more dynamic images, an activity value of a concentration of a radioactive tracer in the blood pool representing in the reference image exceeding a threshold; and matching the reference image with one of the one or more dynamic images to determine the target region represented in the image.

In some embodiments, the determining a target region from the ROI represented in the image may further include determining the target region represented in the image using a trained machine learning model.

In some embodiments, the ROI may include at least one of an aortic region or a heart.

In some embodiments, a length of the reconstructed AFOV of the ROI may be larger than a length threshold.

According to a second aspect of the present disclosure, a method is provided. The method may be implemented on at least one computing device, each of which may include at least one processor and a storage device. The method may include obtaining image data of an object acquired by an imaging device; determining one or more regions of interest (ROIs) of the object; determining, based on each ROI of the one or more ROIs, a target portion of the image data corresponding to the ROI among the image data; and reconstructing, based on the target portion of the image data, one or more images of the ROI.

According to a third aspect of the present disclosure, a non-transitory computer-readable medium storing at least one set of instructions is provided. When executed by at least one processor, the at least one set of instructions may direct the at least one processor to perform a method. The method may include obtaining image data of an object acquired by an imaging device; determining one or more regions of interest (ROIs) of the object; determining, based on each ROI of the one or more ROIs, a target portion of the image data corresponding to the ROI among the image data; and reconstructing, based on the target portion of the image data, one or more images of the ROI.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein.

DETAILED DESCRIPTION

Figure 1:
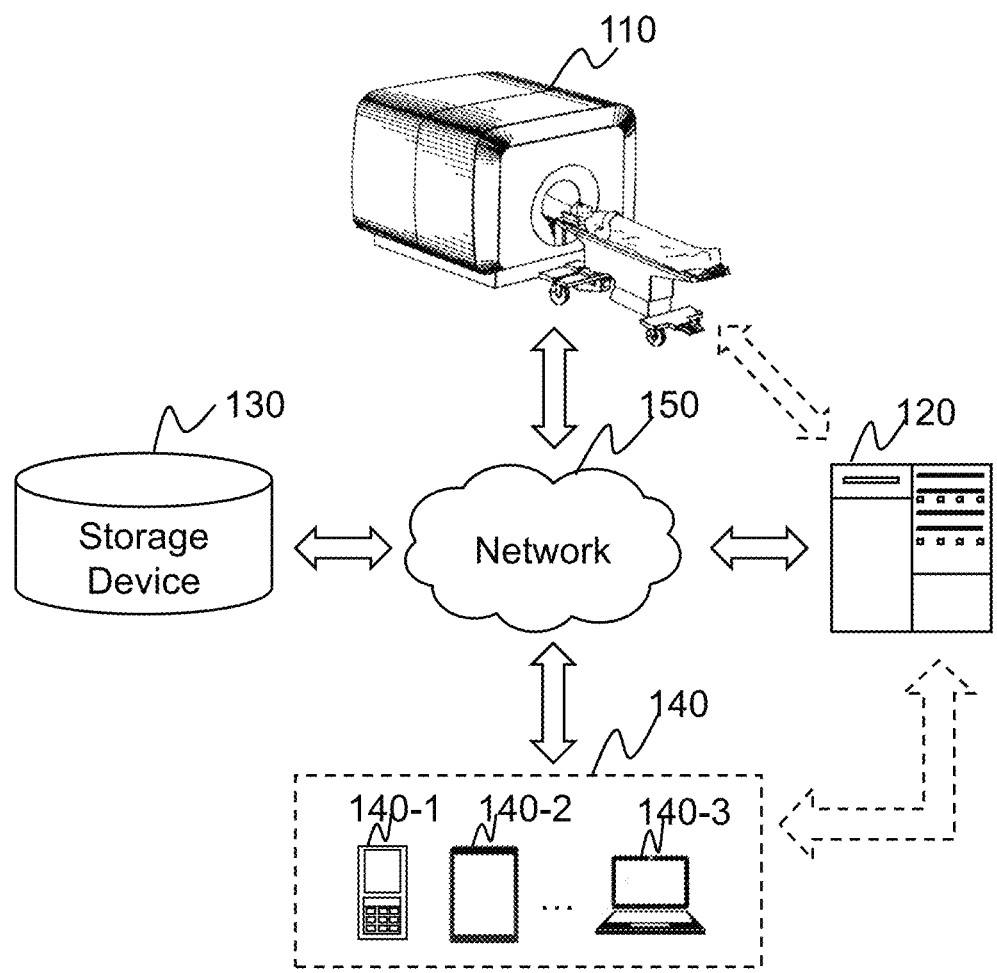
FIG. 1 is a schematic diagram illustrating an exemplary imaging system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for reconstructing an image and/or generating a plasma input function based on a reconstructed image. A system may include at least one storage device storing executable instructions, and at least one processor in communication with the at least one storage device. When executing the executable instructions, the at least one processor may cause the system to perform operations. The operations may include obtaining image data of an object acquired by an imaging device. The operations may include determining one or more regions of interest (ROIs) of the object. The operations may also include determining, based on each ROI of the one or more ROIs, a target portion of the image data among the image data. The target portion of the image data may correspond to the ROI. Further, the operations may include reconstructing, based on the target portion of the image data, one or more images of the ROI. By determining the ROI, the target portion of the image data corresponding to the ROI among the image data may be reconstructed, which improves the speed for image reconstruction and image quality.

In some embodiments, the imaging device may include a PET device, and the operations may further include obtaining a reference image of the ROI acquired by another imaging device (e.g., a CT device) and performing an attenuation correction on the target portion of the image data based on the reference image. Accordingly, the attenuation correction of the target portion of the image data may be performed based on the reference image of the ROI that is acquired by the imaging device only scanning the ROI, which reduces a radiation dose received by the object and further improve safety of the object.

In some embodiments, the operations may further include determining, based on the one or more images of the ROI, a plasma input function. Since the plasma input function only corresponds to the ROI and the speed for reconstructing the images of ROI is improved using the target portion of the image data, a determination speed of the plasma input function may be improved and machine resources may be saved effectively.

FIG. 1 is a schematic diagram illustrating an exemplary imaging system according to some embodiments of the present disclosure. In some embodiments, the imaging system 100 may be a single-modality system or a multi-modality system. Exemplary single-modality systems may include a positron emission tomography (PET) system, a single-photon emission computed tomography (SPECT) system, a magnetic resonance (MR) system, a computed tomography (CT) system, etc. Exemplary multi-modality systems may include a magnetic resonance-positron emission tomography (MR-PET) system, a positron emission tomography-computed tomography (PET-CT) system, etc.

In some embodiments, the imaging system 100 may include modules and/or components for performing imaging and/or related analysis.

Merely by way of example, as illustrated in FIG. 1, the imaging system 100 may include a medical device 110, a processing device 120, a storage device 130, one or more terminals 140, and a network 150. The components in the imaging system 100 may be connected in one or more of various ways. Merely by way of example, the medical device 110 may be connected to the processing device 120 through the network 150. As another example, the medical device 110 may be connected to the processing device 120 directly as illustrated in FIG. 1. As a further example, the terminal(s) 140 may be connected to another component of the imaging system 100 (e.g., the processing device 120) via the network 150. As still a further example, the terminal(s) 140 may be connected to the processing device 120 directly as illustrated by the dotted arrow in FIG. 1. As still a further example, the storage device 130 may be connected to another component of the imaging system 100 (e.g., the processing device 120) directly as illustrated in FIG. 1, or through the network 150.

The medical device 110 may be configured to acquire imaging data relating to at least one part of an object. The imaging data relating to at least one part of an object may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. The object may be biological or non-biological. For example, the object may include a patient, a man-made object, etc. As another example, the object may include a specific portion, organ, and/or tissue of the patient. For example, the object may include the head, the neck, the thorax, the heart, the stomach, a blood vessel, soft tissue, a tumor, nodules, or the like, or any combination thereof. In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device, or the like, or any combination thereof. In some embodiments, the medical device 110 may include a multi-modality imaging device. Exemplary multi-modality imaging devices may include a PET-CT device, a PET-MRI device, or the like, or a combination thereof. For example, the medical device 110 may include a PET device. The PET device may scan an object or a portion thereof that is located within its detection region and generate projection data relating to the object or the portion thereof. The PET device may scan an object or a portion thereof that is located within its detection region and generate projection data relating to the object or the portion thereof. The PET device may include a gantry, a detector, an electronics module, and/or other components not shown. The gantry may support one or more parts of the PET device, for example, a detector assembly, an electronics module, and/or other components. The detector assembly may detect radiation photons (e.g., γ photons) emitted from an object being examined. The electronics module may collect and/or process electrical signals (e.g., scintillation pulses) generated by the detector. The electronics module may convert an analog signal (e.g., an electrical signal generated by the detector) relating to a radiation photon detected by the detector to a digital signal relating to a radiation event. As used herein, a radiation event (also referred to as a single event) may refer to an interaction between a radiation photon emitted from an object and impinging on and detected by the detector. A pair of radiation photons (e.g., γ photons) interacting with two detector blocks along a line of response (LOR) within a coincidence time window may be determined as a coincidence event. A portion of the radiation photons (e.g., γ photons) emitted from an object being examined may interact with tissue in the object. The radiation photons (e.g., γ photons) interacting with tissue in the object may be scattered or otherwise change their trajectory, that may affect the number or count of radiation photons (e.g., γ photons) detected by two detecting units along a line of response (LOR) within a coincidence time window and the number or count of coincidence events. More descriptions for the medical device 110 may be found in elsewhere in the present disclosure (e.g., FIGS. 9A and 9B).

The processing device 120 may process data and/or information obtained from the medical device 110, the terminal(s) 140, and/or the storage device 130. For example, the processing device 120 may obtain image data of an object acquired by an imaging device (e.g., the medical device 110). The processing device 120 may determine one or more regions of interest (ROIs) of the object. The processing device 120 may determine, based on each ROI of the one or more ROIs, a target portion of the image data among the image data. The target portion of the image data may correspond to the ROI. Further, the processing device 120 may reconstruct, based on the target portion of the image data, one or more images of the ROI. In some embodiments, the processing device 120 may determine, based on the one or more images of the ROI, a plasma input function. As another example, for each of the one or more images, the processing device 120 may determine a target region from the ROI represented in the image. The target region may represent a blood pool. In some embodiments, the processing device 120 may determine the target region represented in the image using a trained machine learning model.

The trained machine learning model used in the present disclosure (e.g., the first trained machine learning model and/or second trained machine learning model) may be updated from time to time, e.g., periodically or not, based on a sample set that is at least partially different from the original sample set from which the original trained machine learning model is determined. For instance, the trained machine learning model (e.g., the first trained machine learning model and/or second trained machine learning model) may be updated based on a sample set including new samples that are not in the original sample set. In some embodiments, the determination and/or updating of the trained machine learning model (e.g., the first trained machine learning model and/or second trained machine learning model) may be performed on a processing device, while the application of the trained machine learning model may be performed on a different processing device. In some embodiments, the determination and/or updating of the trained machine learning model (e.g., the first trained machine learning model and/or second trained machine learning model) may be performed on a processing device of a system different than the imaging system 100 or a server different than a server including the processing device 120 on which the application of the trained machine learning model is performed. For instance, the determination and/or updating of the trained machine learning model (e.g., the first trained machine learning model and/or second trained machine learning model) may be performed on a first system of a vendor who provides and/or maintains such a machine learning model and/or has access to training samples used to determine and/or update the trained machine learning model, while image generation based on the provided machine learning model may be performed on a second system of a client of the vendor. In some embodiments, the determination and/or updating of the trained machine learning model (e.g., the first trained machine learning model and/or second trained machine learning model) may be performed online in response to a request for image generation. In some embodiments, the determination and/or updating of the trained machine learning model may be performed offline.

In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the medical device 110, the terminal(s) 140, and/or the storage device 130 via the network 150. As another example, the processing device 120 may be directly connected to the medical device 110, the terminal(s) 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 130 may store data, instructions, and/or any other information. In some embodiments, the storage device 130 may store data obtained from the terminal(s) 140 and/or the processing device 120. The data may include image data acquired by the processing device 120, algorithms and/or models for processing the image data, etc. For example, the storage device 130 may store image data (e.g., PET images, PET projection data, etc.) acquired by the medical device 110. As another example, the storage device 130 may store one or more algorithms for processing the image data, a trained machine learning model for image generation, etc. In some embodiments, the storage device 130 may store data and/or instructions that the processing device 120 may execute or use to perform exemplary methods/systems described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be directly connected to or communicate with one or more other components in the imaging system 100 (e.g., the processing device 120, the terminal(s) 140, etc.). In some embodiments, the storage device 130 may be part of the processing device 120.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™ a Gear VR™, etc. In some embodiments, the terminal(s) 140 may be part of the processing device 120.

The network 150 may include any suitable network that can facilitate the exchange of information and/or data for the imaging system 100. In some embodiments, one or more components of the medical device 110 (e.g., an MRI device, a PET device, etc.), the terminal(s) 140, the processing device 120, the storage device 130, etc., may communicate information and/or data with one or more other components of the imaging system 100 via the network 150. For example, the processing device 120 may obtain data from the medical device 110 via the network 150. As another example, the processing device 120 may obtain user instructions from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios.

Figure 2:
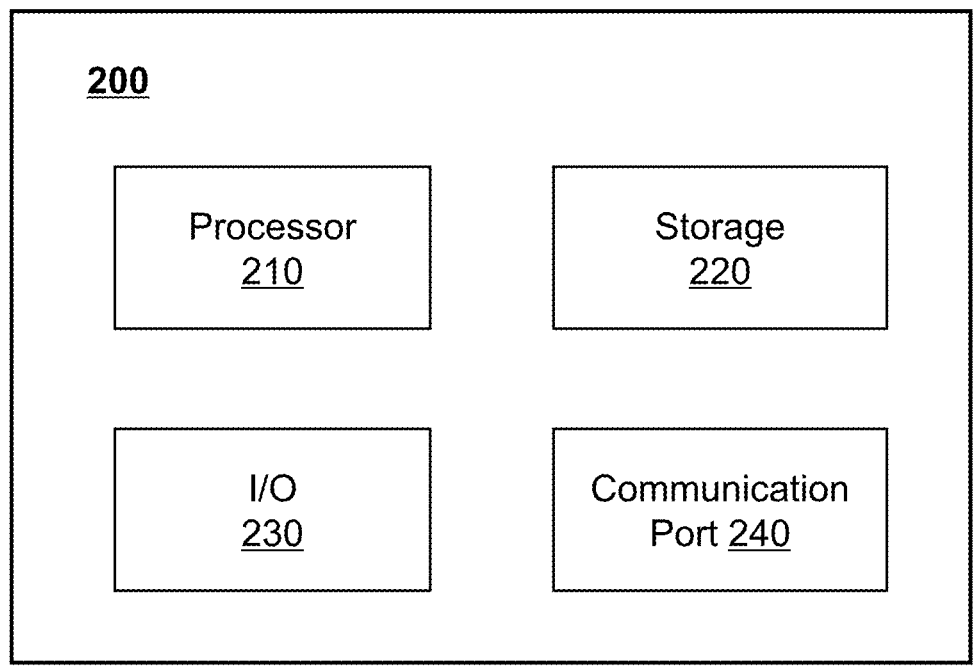
FIG. 2 is a schematic diagram illustrating hardware and/or software components of an exemplary computing device on which the processing device may be implemented according to some embodiments of the present disclosure.

FIG. 2 is a schematic diagram illustrating hardware and/or software components of an exemplary computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. For example, the processor 210 may process data obtained from the medical device 110, the terminal(s) 140, the storage device 130, and/or any other component of the imaging system 100. Specifically, the processor 210 may process image data obtained from the medical device 110. For example, the processor 210 may determine a target portion of the image data among the image data. As another example, the processor 210 may reconstruct, based on the target portion of the image data, one or more images of an ROI. In some embodiments, the reconstructed image may be stored in the storage device 130, the storage 220, etc. In some embodiments, the reconstructed image may be displayed on a display device by the I/O 230. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical device 110, the terminal(s) 140, the storage device 130, or any other component of the imaging system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 120 for generating attenuation correction data for a PET image.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the medical device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
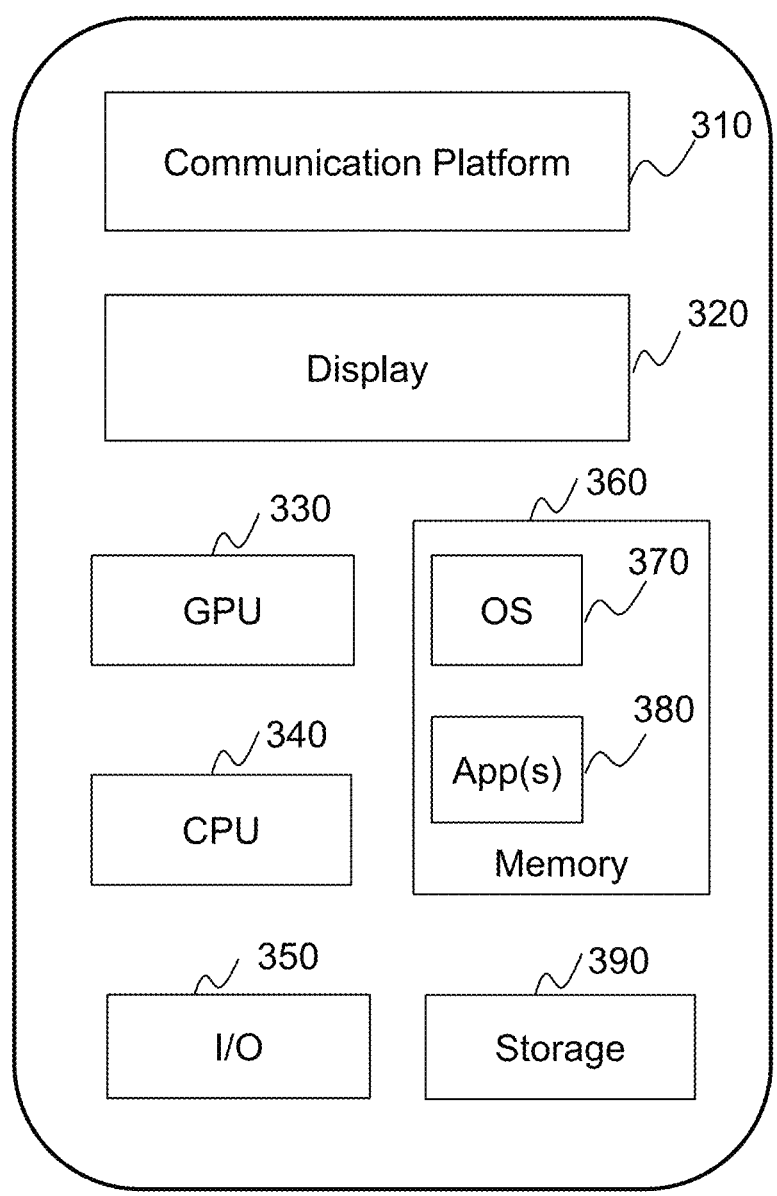
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the imaging system 100 via the network 150.

To implement various modules, units, and functionalities described in the present disclosure, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 4A:
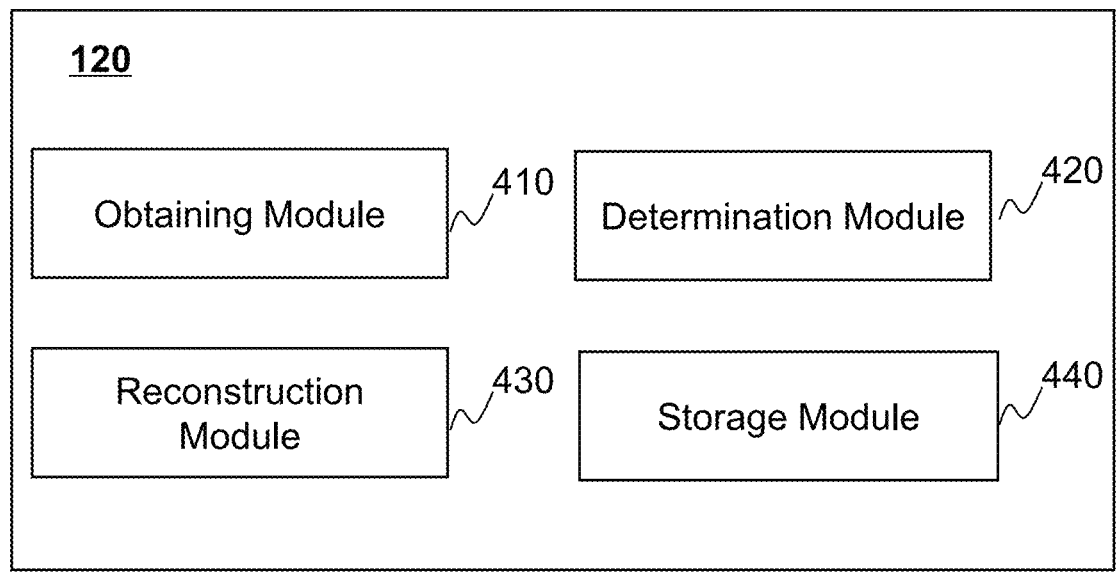
FIG. 4A is a block diagram illustrating an exemplary processing device according to some embodiments of the present disclosure.

FIG. 4A is a block diagram illustrating an exemplary processing device according to some embodiments of the present disclosure. In some embodiments, processing device 120 may be implemented on a computing device 200 (e.g., the processor 210) illustrated in FIG. 2 or a CPU 340 as illustrated in FIG. 3. As illustrated in FIG. 4A, the processing device 120 may include an obtaining module 410, a determination module 420, a reconstruction module 430, and a storage module 440. Each of the modules described above may be a hardware circuit that is designed to perform certain actions, e.g., according to a set of instructions stored in one or more storage media, and/or any combination of the hardware circuit and the one or more storage media.

The obtaining module 410 may be configured to obtain image data of an object acquired by an imaging device. The image data of the object may be configured to provide a representation of the object. In some embodiments, the image data may be obtained from the imaging device (e.g., the medical device 110). For example, the medical device 110 may acquire the image data of the object and transmit the acquired image data of the object to the processing device 120. As another example, if the imaging device is a PET device, the image data of the object may be PET image data (e.g., raw data, sinogram, etc.). As used herein, the raw data may include radiation events recorded by each of detecting units. In some embodiments, the raw data may be denoted as a matrix, where each element corresponds to the number of radiation events recorded by a pair of detecting units along a line of response (LOR). In some embodiments, the raw data may be denoted as a sinogram. In some embodiments, the obtaining module 410 may obtain the image data of the object from a storage device, for example, the storage device 130, or any other storage.

The determination module 420 may be configured to determine one or more regions of interest (ROIs) of the object. An ROI of the object refers to a region of the object that a user (e.g., a doctor, a technician, an operator, etc.) focuses on. In some embodiments, the determination of an ROI may include determining a position of the ROI in a scanning region of the imaging device (also referred to as a first imaging device) as described in operation 510. In some embodiments, the ROI may be determined based on a reference image (also referred to as a first reference image) of the object acquired by an imaging device (also referred to as a second imaging device) that is the same as or different from the first image device acquiring the image data of the object as described in operation 510. The determination of the ROI based on the first reference image may include identifying the ROI from the reference image and determining the position of the ROI in the scanning region of the first imaging device. The determination module 420 may determine the position of the ROI in the scanning region of the first imaging device based on a relationship between the coordinate system of the first imaging device and the coordinate system of the second imaging device. In some embodiments, the one or more ROIs may be identified from the first reference image using an ROI identification technique (e.g., an image segmentation technique, a machine learning technique, etc.).

The determination module 420 may also be configured to determine, based on each ROI of the one or more ROIs, a target portion of the image data among the image data. The target portion of the image data may correspond to the ROI. In some embodiments, the determination module 420 may determine a reconstructed AFOV of the ROI in the imaging device according to the position of the ROI in the scanning region of the imaging device. The determination module 420 may determine the target portion of the image data based on the reconstructed AFOV of the ROI. In some embodiments, the determination module 420 may determine a detector ring range corresponding to the reconstructed AFOV. The detector ring range may be defined by a first detector ring corresponding to a starting position of the reconstructed AFOV (or the axial range of the ROI) and a second detector ring corresponding to an ending position of the reconstructed AFOV (or the axial range of the ROI). The determination module 420 may determine LORs that traverse the reconstructed AFOV based on positions of the first detector ring and the second detector rings.

The reconstruction module 430 may be configured to reconstruct, based on the target portion of the image data, one or more images of the ROI. In some embodiments, the reconstruction module 430 may generate the one or more images by performing a reconstruction operation on the target portion of the image data using an image reconstruction technique. In some embodiments, before performing the reconstruction on the target portion of the image data, the reconstruction module 430 may perform a correction operation on the target portion of the image data. The correction operation may include a normalized correction, a scattering correction, an attenuation correction, a random correction, or the like, or a combination thereof. In some embodiments, when performing the attenuation correction on the target portion of the image data, the reconstruction module 430 may obtain a reference image (also referred to as a second reference image) of the ROI. The reconstruction module 430 may perform the attenuation correction on the target portion of the image data based on the second reference image. In some embodiments, the reconstruction module 430 may reconstruct, based on reference image data (e.g., projection data, k-space data), one or more second reference images using a reconstruction technique. The reconstruction technique may correspond to the type of the reference image data.

In some embodiments, the reconstruction module 430 may perform the attenuation correction on the target portion of the image data by generating one or more attenuation image data based on the one or more second reference images. Since pixels/voxels in a second reference image present the distribution of attenuation coefficients relating to various portions or compositions of the ROI, the one or more second reference images may be converted to one or more attenuation images. Subsequently, the reconstruction module 430 may perform an attenuation correction on the target portion of the image data based on the one or more attenuation images. The reconstruction module 430 may reconstruct the one or more images of the ROI based on the projected attenuation data and the image data using an image reconstruction technique as described elsewhere in the present disclosure. The reconstruction module 430 may determine, based on the reconstructed AFOV of the ROI, an axial dimensionality of the one or more images. The reconstruction module 430 may reconstruct the one or more images of the ROI based on the axial dimensionality. In some embodiments, the reconstruction module 430 may further determine, based on the reconstructed AFOV of the ROI and the axial dimensionality of the one or more images, a total dimensionality of the one or more images. Since a size of a pixel is determined based on an input of the user or the parameters of the imaging device, the total dimensionality of the one or more images may be determined after the axial dimensionality of the one or more images is determined. In some embodiments, the reconstruction module 430 may reconstruct, based on the target portion of the image data and the total dimensionality of the one or more images, the one or more images of the ROI.

In some embodiments, the determination module 420 may further be configured to determine, based on the one or more images of the ROI, a plasma input function. The one or more images of the ROI may be dynamic images arranged in time sequence. Each of the one or more images of the ROI may be determined based on the target portion of the image data that traverse the reconstructed AFOV of the ROI in a time duration. The time durations corresponding to the one or more images may be consecutive. In other words, the images of the ROI may include representations of the ROI changes along time. The dynamic images may form an image sequence. The plasma input function may be also referred to as a plasma time activity curve (TAC). The plasma input function associated with the blood vessel may describe the change of the concentration of radioactivity of the tracer (i.e., radioactivity activity or concentration) in the plasma with time. In some embodiments, the determination module 420 may determine the plasma input function (also referred to as an image-derived input function, IDIF) based on the one or more images of the ROI. In some embodiments, the plasma TAC of the object may be determined using a PET blood pool scan technique. The determination module 420 may identify a blood TAC from the one or more images based on the determined ROI and designate the blood TAC as the plasma TAC. The plasma TAC identified from the image sequence may be also referred to as an image-derived input function. In some embodiments, the plasma TAC of the object may be determined using a machine learning technique (i.e., a plasma input function determination model).

The storage module 440 may be configured to store data and/or instructions associated with the imaging system 100. For example, the storage module 440 may store data of the image data of the object acquired by the imaging device, the one or more ROIs of the object, the ROI determination model, the target portion of the image data among the image data, the plasma input function determination model, etc. In some embodiments, the storage module 440 may be the same as the storage device 130 and/or the storage module 470 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the determination module 420 and the reconstruction module 430 may be integrated into a single module. As another example, the determination module 420 may be divided into an ROI determination module, a target portion determination module, and a plasma input function determination module. As a still example, some other components/modules may be added into the processing device 120.

Figure 4B:
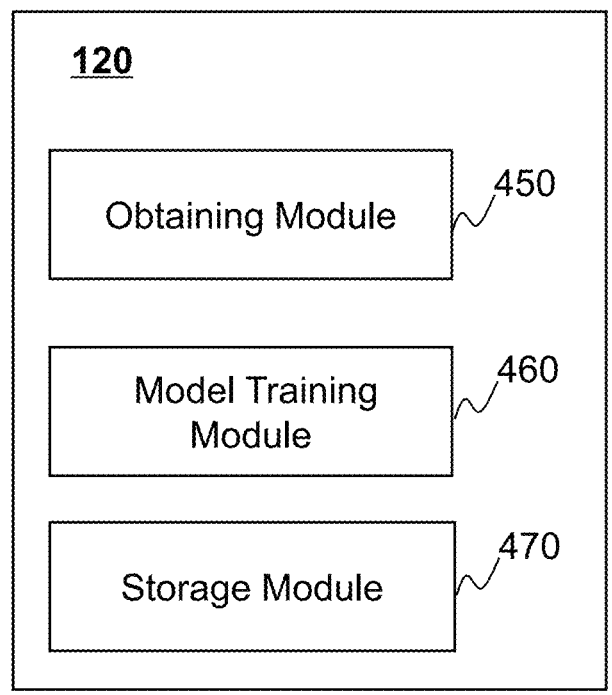
FIG. 4B is a block diagram illustrating an exemplary processing device according to some embodiments of the present disclosure.

FIG. 4B is a block diagram illustrating an exemplary processing device according to some embodiments of the present disclosure. In some embodiments, processing device 120 may be implemented on a computing device 200 (e.g., the processor 210) illustrated in FIG. 2 or a CPU 340 as illustrated in FIG. 3. As illustrated in FIG. 4B, the processing device 120 may include an obtaining module 450, a model training module 460, and a storage module 470. Each of the modules described above may be a hardware circuit that is designed to perform certain actions, e.g., according to a set of instructions stored in one or more storage media, and/or any combination of the hardware circuit and the one or more storage media.

The obtaining module 450 may be configured to obtain multiple groups of training samples. In some embodiments, if the machine learning model is trained to obtain the ROI determination model as described in operation 520, the multiple groups of training samples may be also referred to as the multiple groups of first training samples as described in FIG. 5. Each group of the multiple groups of training samples may correspond to a sample object. Each group of first training samples may include a training scout image of a sample object and a reference image (also referred to as a third reference image) corresponding to the training scout image of the sample object. In some embodiments, if the machine learning model is trained to obtain the trained machine learning model for determining a plasma inputted function as described in operation 550, the multiple groups of training samples may be also referred to as the multiple groups of second training samples as described in FIG. 5. Each group of the multiple groups of training samples may correspond to an ROI. Each group of second training samples may include a group of dynamic images arranged in times sequence and a reference plasma inputted function. The reference plasma inputted function may correspond to the group of dynamic images arranged in times sequence. In some embodiments, if the machine learning model is trained to obtain the target portion determination model as described in operation 730, the multiple groups of training samples may be also referred to as the multiple groups of third training samples as described in FIG. 7. Each group of the multiple groups of training samples may correspond to an ROI. Each group of third training samples may include a training image of a training ROI and a reference image (also referred to as a fourth reference image) corresponding to a target portion of the training ROI. The fourth reference image may be the training image labeled with the corresponding target portion.

The model training module 460 may be configured to generate a trained machine learning model by training a machine learning model using the multiple groups of training samples in a training process. In some embodiments, the model training module 460 may construct the trained machine learning model based on a convolutional neural network (CNN) model, a recurrent neural network (RNN) model, a long short term memory (LSTM) network model, a fully convolutional neural network (FCN) model, a generative adversarial network (GAN) model, a back propagation (BP) machine learning model, a radial basis function (RBF) machine learning model, a deep belief nets (DBN) machine learning model, an Elman machine learning model, or the like, or any combination thereof. The model training module 460 may train the machine learning model based on the multiple groups of training samples using a training algorithm. In some embodiments, the model training module 460 may perform a plurality of iterations to iteratively update one or more parameter values of the machine learning model to obtain the trained machine learning model. Before the plurality of iterations, the model training module 460 may initialize the parameter values of the machine learning model.

The storage module 470 may be configured to store data and/or instructions associated with the imaging system 100. For example, the storage module 440 may store data of multiple groups of training samples (e.g., the first training sample, the second training samples, and the third training samples), one or more machine learning models, the trained machine learning model, etc. In some embodiments, the storage module 470 may be the same as the storage device 130 and/or the storage module 440 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the obtaining module 450 and the storage module 470 may be integrated into a single module. As another example, some other components/modules may be added into the processing device 120.

Figure 5:
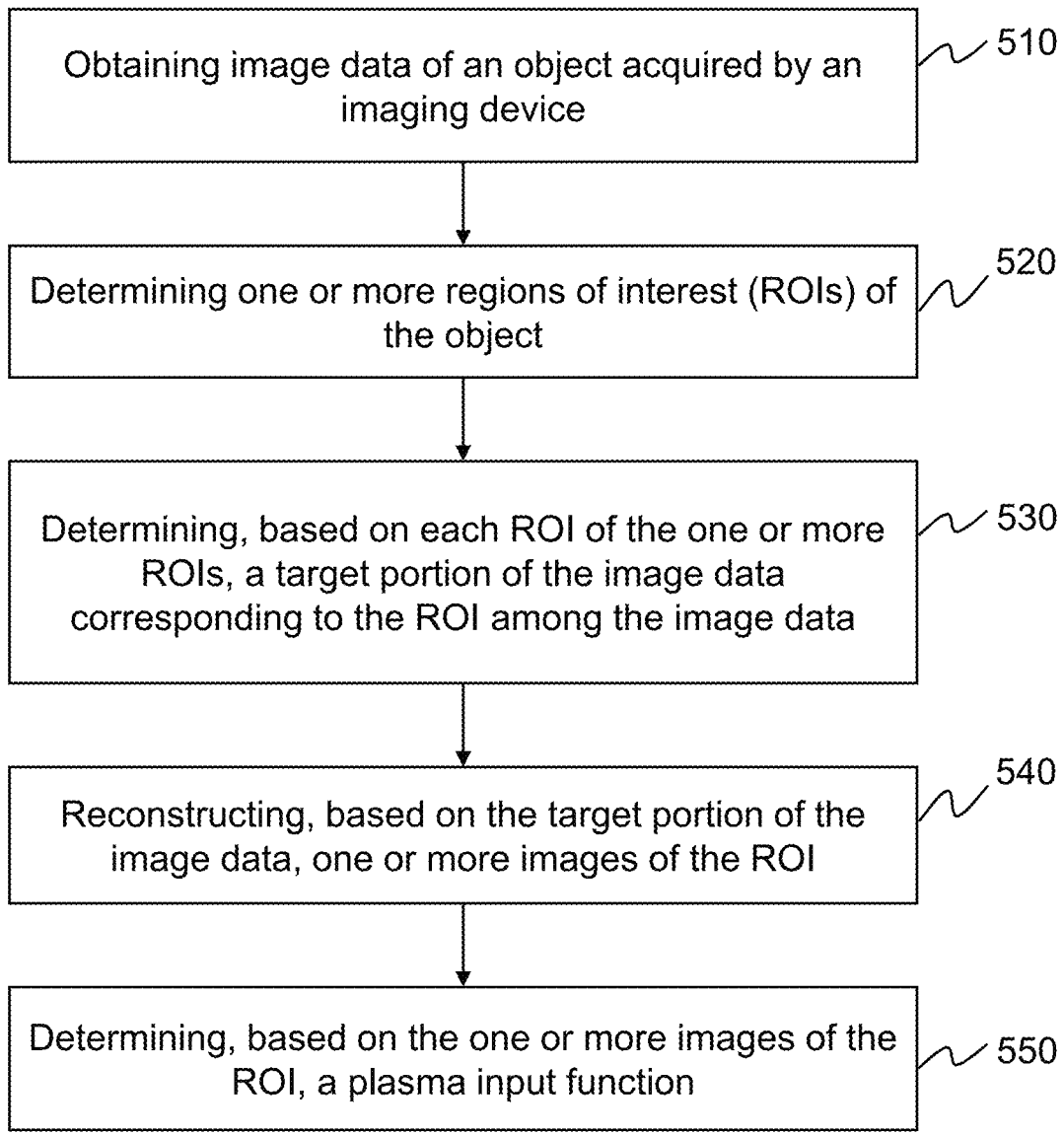
FIG. 5 is a schematic flowchart illustrating an exemplary process for reconstructing an image and/or determining a plasma input function according to some embodiments of the present disclosure.

FIG. 5 is a schematic flowchart illustrating an exemplary process for reconstructing an image and/or determining a plasma input function based on the reconstructed image according to some embodiments of the present disclosure. In some embodiments, process 500 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the processor 210, and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) may obtain image data of an object acquired by an imaging device.

The object may be biological or non-biological. For example, the object may include a patient, a man-made object, etc. As another example, the object may include a specific portion, organ, and/or tissue of the patient.

In some embodiments, the imaging device (e.g., the medical device 110) may include a plurality of detector rings arranged along an axial direction of the imaging device. Each of the plurality of detector rings may include detecting units arranged along a radial direction of the imaging device. The axial direction of the imaging device refers to an extension direction of the plurality of detector rings, that is, a movement direction of a scanning table of the imaging device. The imaging device may include a PET device, a SPECT device, a PET-MRI device, a PET-CT device, etc., as described elsewhere in the present disclosure (e.g., FIG. 1 and FIG. 9A and the descriptions thereof). More descriptions regarding the imaging device may be found in FIGS. 9A-9B and the descriptions thereof.

The image data of the object may be configured to provide a representation of the object. In some embodiments, the image data may be obtained from the imaging device (e.g., the medical device 110). For example, the medical device 110 may acquire the image data of the object and transmit the acquired image data of the object to the processing device 120. For example, if the imaging device is a PET device, the image data of the object may be PET image data (e.g., raw data, sinogram, etc.). As used herein, the raw data may include radiation events recorded by each of the detecting units. In some embodiments, the raw data may be denoted as a matrix, where each element corresponds to the number of radiation events recorded by a pair of detecting units along a line of response (LOR). In some embodiments, the raw data may be denoted as a sinogram. In some embodiments, the processing device 120 (e.g., the obtaining module 410) may obtain the image data of the object from a storage device, for example, the storage device 130, or any other storage. For example, the medical device 110 may acquire the image data of the object and store the acquired image data of the object in the storage device. The processing device 120 may obtain the image data of the object from the storage device.

In 520, the processing device 120 (e.g., the determination module 420) may determine one or more regions of interest (ROIs) of the object.

Figure 10:
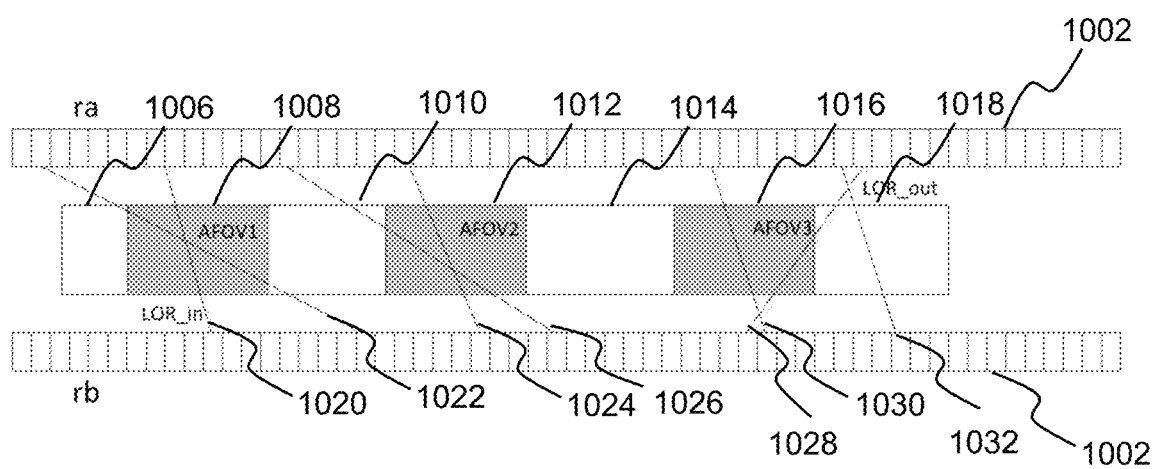
FIG. 10 is a schematic diagram illustrating image data corresponding to an ROI according to some embodiments of the present disclosure.

An ROI of the object refers to a region of the object that a user (e.g., a doctor, a technician, an operator, etc.) focuses on. In some embodiments, the ROI of the object may be the entire object or a portion of the object. For example, the object may be a body of a patient, and the ROI of the object may be the heart of the body. As another example, the object may be a left hand of a patient and the ROI of the object may be the left hand of the patient. As a further example, the ROI may include an aortic region, a heart, or the like, or any combination thereof. In some embodiments, the one or more ROIs may be located continuously or discontinuously in the object. For example, regions 1006, 1008, 1010, 1012, 1014, 1016, and 1018 in FIG. 10 are ROIs, and the regions are located in the object continuously. As another example, regions 1008, 1012, and 1016 in FIG. 10 are ROIs, and the regions 1008, 1012, and 1016 are located in the object discontinuously.

In some embodiments, the determination of an ROI may include determining a position of the ROI in a scanning region of the imaging device (also referred to as a first imaging device) as described in operation 510. For example, the processing device 120 may determine coordinates of the ROI in a coordinate system of the first imaging device. As another example, the processing device 120 may determine an axial range of the ROI in the scanning region of the first imaging device along the axial direction. The axial range of the ROI in the scanning region may be defined by a starting position and an ending position of the ROI in the scanning region along the axial direction.

In some embodiments, the ROI may be determined based on a reference image (also referred to as a first reference image) of the object acquired by an imaging device (also referred to as a second imaging device) that is the same as or different from the first image device acquiring the image data of the object as described in operation 510. The determination of the ROI based on the first reference image may include identifying the ROI from the first reference image and determining the position of the ROI in the scanning region of the first imaging device based on the ROI represented in the first reference image. For example, the processing device 120 may identify the ROI from the first reference image and determine a position of the ROI in a coordinate system of the second imaging device. The processing device 120 may determine the position of the ROI in the scanning region of the first imaging device based on a relationship between the coordinate system of the first imaging device and the coordinate system of the second imaging device.

The first reference image may include a pre-scanning image, a scout image (or a scout image), a diagnostic image, etc. For example, the pre-scanning image may be acquired by an MR device via scanning the object according to a fast pre-scanning sequence (also referred to as a fast pre-scanning pulse sequence). Exemplary fast pre-scanning sequences may include a low-resolution magnetic resonance sequence, a fast pulse sequence, etc. For example, the fast pulse sequence may include a 3D gradient recalled echo (GRE) sequence, a single-shot fast spin-echo (SSFSE) sequence, etc. In some embodiments, the scout image may be acquired by the second imaging device via scanning the object according to a positioning scanning technique. Exemplary positioning scanning techniques may include using camera imaging, infrared imaging, radiation imaging, etc.

For example, the scout image may be acquired by an optical imaging device (e.g., a camera). As another example, the scout image may be acquired by a radiation imaging device (e.g., the medical device 110, a scanner of another modality of the medical device 110, other imaging devices, etc.). The second imaging device may include a PET device, an MR device, a CT device, an X-ray device, an infrared scanning device, or the like, or any combination thereof. After obtaining the scout image, the one or more ROIs of the object may be determined manually or automatically. In some embodiments, the one or more ROIs of the object may be identified from the first reference image manually by a user. For example, a user may label the boundary of each of the one or more ROIs of the object on the scout image through an input device (e.g., a mouse, a keyboard, etc.). As another example, the user may label the one or more ROIs of the object on the scout image by moving a selection frame through an input device.

In some embodiments, the one or more ROIs may be identified from the first reference image using an ROI identification technique (e.g., an image segmentation technique, a machine learning technique, etc.).

For example, the processing device 120 may process the scout image based on an image segmentation technique to segment the one or more ROIs. Exemplary image segmentation techniques may include a region-based segmentation, an edge-based segmentation, a wavelet transform segmentation, a mathematical morphology segmentation, an artificial neural network-based segmentation, a genetic algorithm-based segmentation, or the like, or a combination thereof. As another example, the processing device 120 may process the scout image based on a trained machine learning model (also referred to as a trained ROI determination model). In some embodiments, the processing device 120 may retrieve the trained ROI determination model from a storage device (e.g., the storage device 130, the terminals(s) 140, or any other storage device). For example, the trained ROI determination model may be determined by training a machine learning model offline based on a plurality of training samples using the processing device 120 or a processing device other than the processing device 120. The trained ROI determination model may be stored in the storage device 130, the terminals(s) 140, or any other storage device. For instance, the processing device 120 may retrieve the trained ROI determination model from the storage device 130, the terminals(s) 140, or any other storage device in response to receipt of a request for determining the one or more ROIs. In some embodiments, the processing device 120 may input the scout image of the object into the trained ROI determination model. An output result may be generated by the trained ROI determination model. The output result of the ROI trained determination model may include the scout image with the one or more determined ROIs.

In 530, the processing device 120 (e.g., the determination module 420) may determine, based on each ROI of the one or more ROIs, a target portion of the image data among the image data. The target portion of the image data may correspond to the ROI.

In some embodiments, the processing device 120 may determine a reconstructed AFOV of the ROI in the first imaging device according to the position of the ROI in the scanning region of the first imaging device. The processing device 120 may determine the target portion of the image data based on the reconstructed AFOV of the ROI.

As used herein, the reconstructed AFOV of the ROI may refer to a reconstructed range of the ROI in the axial direction. The reconstructed AFOV of the ROI may also be referred to as a sub-AFOV. The reconstructed AFOV of the ROI may be associated with the axial range of the ROI. For example, the reconstructed AFOV of the ROI may be defined by a space between two detecting rings aligning to a starting position and an ending position of the axial range of the ROI, respectively in a vertical direction. In some embodiments, the image data of the object may relate to multiple lines of response (LORs) traversing the AFOV (also referred to as full AFOV) of the first imaging device. For example, the image data may include coincidence events recorded by detecting units along each of the multiple LORs. Each of the multiple LORs may be associated with two detector units that are located on two sides of the axial direction. The target portion of the image data corresponding to the ROI may relate to a target LORs among the multiple LORs that traverse the reconstructed AFOV of the ROI. As used herein, an LOR traversing a reconstructed AFOV refers to that at least a portion of the LOR is within the reconstructed AFOV, i.e., the space between two detecting rings aligning to the starting position and the ending position of the axial range of the ROI, respectively in the vertical direction.

In some embodiments, the processing device 120 may determine a detector ring range corresponding to the reconstructed AFOV. The detector ring range may be defined by a first detector ring corresponding to a starting position of the reconstructed AFOV (or the axial range of the ROI) and a second detector ring corresponding to an ending position of the reconstructed AFOV (or the axial range of the ROI). The processing device 120 may determine LORs that traverse the reconstructed AFOV based on positions of the first detector ring and the second detector rings. For example, the processing device 120 may designate LORs each of which connects two detecting units that are within the detector ring range as the target LORs. More descriptions regarding the determination of the target LORs may be found in FIG. 6 and the descriptions thereof.

In some embodiments, there are a plurality of ROIs in the object, and a plurality of groups of image data may be determined each of which corresponds to one of the plurality of ROIs. Each group of image data may include a target portion of the image data corresponding to an ROI. The target LORs corresponding to at least two groups of image data may be overlapped or different. In some embodiments, the plurality of groups of image data may be stored and processed, respectively. For example, a first group of image data corresponding to AFOV 1 and a second group of image data corresponding to AFOV 2 may be stored in different spaces (e.g., files, paths, storage devices, etc.). As another example, a first group of image data corresponding to AFOV 1 and a second group of image data corresponding to AFOV 2 may be reconstructed, respectively. Alternatively, the plurality of groups of image data may be stored and processed together. In some embodiments, the plurality of groups of image data may be classified based on properties (e.g., a position, a type, etc.) of the ROIs. For example, if ROI 1 and ROI 2 have similar positions and a same type, the processing device 120 may store and process a group of image data corresponding to ROI 1 and a group of image data corresponding to ROI 2 together. As another example, if ROI 1 and ROI 2 have different positions and/or types, the processing device 120 may store and process a group of the image data corresponding to ROI 1 and a group of image data corresponding to ROI 2, respectively.

In 540, the processing device 120 (e.g., the reconstruction module 430) may reconstruct, based on the target portion of the image data, one or more images of the ROI.

In some embodiments, the processing device 120 may generate the one or more images by performing a reconstruction operation on the target portion of the image data using an image reconstruction technique. Exemplary image reconstruction techniques may include an iterative reconstruction algorithm, a Fourier slice theorem algorithm, a filtered back projection (FBP) algorithm, a fan-beam reconstruction algorithm, an analytic reconstruction algorithm, or the like, or any combination thereof. Exemplary iterative reconstruction algorithms may include a statistical reconstruction algorithm, a maximum likelihood expectation maximum algorithm, a conjugate gradient (CG) algorithm, a maximum a posteriori (MAP) algorithm, an ordered subset expectation maximization (OSEM) algorithm, etc. It should be noted that the above reconstruction techniques are merely provided for the purposes of illustration, and not intended to limit the scope of the present disclosure. For example, one or more images of the ROI may be reconstructed based on the target portion of the image data using the OSEM algorithm.

In some embodiments, before performing the reconstruction on the target portion of the image data, the processing device 120 may perform a correction operation on the target portion of the image data. The correction operation may include a normalized correction, a scattering correction, an attenuation correction, a random correction, or the like, or a combination thereof. The normalized correction may be performed based on a reference correction table of the full AFOV of the imaging device. In some embodiments, the normalized correction may be performed on the image data of the object. The scattering correction, the attenuation correction, or the random correction may be performed on the target portion of the image data corresponding to the ROI (i.e., the target LORs that traverse the reconstructed AFOV of the ROI).

In some embodiments, when the processing device 120 performs the attenuation correction on the target portion of the image data, the processing device 120 may obtain a reference image (also referred to as a second reference image) of the ROI. The processing device 120 may perform the attenuation correction on the target portion of the image data based on the second reference image. The second reference image may include a CT image, a PET image, an MR image, an X-ray image, an infrared scanning image, or the like, or any combination thereof. In some embodiments, the processing device 120 may reconstruct, based on reference image data (e.g., projection data, k-space data), the second reference image using a reconstruction technique. The reconstruction technique may correspond to the type of the reference image data. For example, if the reference image data of the ROI includes CT image data, the reconstruction technique may include a CT image reconstruction technique. Exemplary CT image reconstruction techniques may include an iterative reconstruction algorithm, an analytic reconstruction algorithm, an algebraic iterative reconstruction algorithm, a conjugate gradient algorithm, a maximum likelihood expectation maximum algorithm, a Bayesian algorithm, or the like, or any combination thereof. As another example, if the reference image data of the ROI includes MR image data (e.g., k-space data), the reconstruction technique may include an MR image reconstruction technique. Exemplary MR image reconstruction techniques may include a 2-dimensional Fourier transform technique, a back projection technique (e.g., a convolution back projection technique, a filtered back projection technique), an iteration technique, etc. Exemplary iteration techniques may include an algebraic reconstruction technique (ART), a simultaneous iterative reconstruction technique (SIRT), a simultaneous algebraic reconstruction technique (SART), an adaptive statistical iterative reconstruction (ASIR) technique, a model-based iterative reconstruction (MBIR) technique, a sinogram affirmed iterative reconstruction (SAFIR) technique, or the like, or any combination thereof.

In some embodiments, the processing device 120 may perform the attenuation correction on the target portion of the image data by generating attenuation data based on the second reference image. Since pixels/voxels in a second reference image present the distribution of attenuation coefficients relating to various portions or compositions of the ROI, the second reference image may be converted to an attenuation image. Subsequently, the processing device 120 may perform an attenuation correction on the target portion of the image data based on the attenuation image. For example, the processing device 120 may project the attenuation image to projected attenuation data using a projection transformation technique (e.g., a Radon transform). The processing device 120 may reconstruct the one or more images of the ROI based on the projected attenuation data and the image data using an image reconstruction technique as described elsewhere in the present disclosure.

In some embodiments, the one or more images of the ROI may include multiple image slices along the axial direction. The processing device 120 may determine, based on the reconstructed AFOV of the ROI, an axial dimensionality of the one or more images. The processing device 120 may reconstruct the one or more images of the ROI based on the axial dimensionality. As used herein, the axial dimensionality of the one or more images of the ROI may refer to a count or number of the image slices of the ROI along the axial direction. The axial dimensionality of the one or more images may be determined according to the following equation (1):

$$d = Cint(I/s), \qquad (1)$$

where d refers to the axial dimensionality, I refers to the axial length of the axial range of an ROI (i.e., AFOV), s refers to the axial size of a pixel, and Cint refers to rounding off a calculation result in the brackets. The axial size of the pixel may be determined by a user or according to a default setting of the system 100. For example, if the axial length of an axial range of an ROI (i.e., AFOV) is 1940 millimeters (i.e., 1=1940 millimeters) and an axial size of a pixel is 2.886 millimeters (i.e., s=2.886 millimeters), the axial dimensionality of the image may be 672. As another example, if an axial length of an axial range of an ROI is 300 millimeters (i.e., 1=300 millimeters) and an axial size of a pixel is 2.886 millimeters (i.e., s=2.886 millimeters), the axial dimensionality of the image may be 104. In some embodiments, the processing device 120 may reconstruct, based on the target portion of the image data and the axial dimensionality, the one or more images of the ROI.

In some embodiments, the processing device 120 may further determine, based on the reconstructed AFOV of the ROI and the axial dimensionality of the one or more images, a total dimensionality of the one or more images. Since a size of a pixel is determined based on an input of the user or the parameters of the imaging device, the total dimensionality of the one or more images may be determined after the axial dimensionality of the one or more images is determined. For example, if a size of an image is designated as 256×256, and the axial dimensionality of the one or more images is 672, the total dimensionality of the image may be denoted as 256×256×672. As another example, if a size of an image is designated as 256×256, and the axial dimensionality of the image is 104, the total dimensionality of the one or more images may be denoted as 256×256×104. In some embodiments, the processing device 120 may reconstruct, based on the target portion of the image data and the total dimensionality of the one or more images, the one or more images of the ROI. In some embodiments, the one or more images of the ROI may form a three-dimensional (3D) image of the ROI. The total dimensionality of the one or more images of the ROI may also be referred to as a dimensionality of the 3D image of the ROI.

In some embodiments, the processing device 120 may display the reconstructed images via an application (e.g., the application 380) or a display device (e.g., a screen, the terminal(s) 140, the display 320, etc.). A size of a displayed image may be the same as a size of the image of the ROI.

According to embodiments of the present disclosure, a mean value of pixel values of each of the one or more images of the ROI may be consistent or substantially consistent with a mean value of pixel values of one or more images reconstructed on the image data of the object corresponding to the full FOV. Therefore, while the quality of a reconstructed image of the ROI based on image data corresponding to the ROI is maintained, reconstruction time may be reduced, thereby increasing the speed for image reconstruction. A reconstruction acceleration ratio of the speed for image reconstruction based on image data corresponding to a reconstructed AFOV of the ROI to the speed for image reconstruction based on image data corresponding to a full AFOV may be defined by a ratio of a length of the full AFOV and a length of the reconstructed AFOV of the ROI. In some embodiments, the length of the full AFOV of the imaging device may be larger than a length threshold. The length threshold may be 1000 millimeters, 1100 millimeters, 1200 millimeters, 1500 millimeters, 1800 millimeters, 1940 millimeters, 2000 millimeters, etc.

In 550, the processing device 120 (e.g., the determination module 420) may determine, based on the one or more images of the ROI, a plasma input function.

The one or more images of the ROI may be dynamic images arranged in time sequence. Each of the one or more images of the ROI may be determined based on the target portion of the image data acquired in a time duration that traverse the reconstructed AFOV of the ROI. In some embodiments, the time durations corresponding to the one or more images may be consecutive. In other words, the images of the ROI may include representations of the ROI changes along time. The dynamic images may form an image sequence.

The plasma input function may also be referred to as a plasma time activity curve (TAC). The plasma input function may describe the change of the concentration of radioactivity of the tracer (i.e., radioactivity activity or concentration) in the plasma with time. In some embodiments, the processing device 120 may determine the plasma input function (also referred to as an image-derived input function, IDIF) based on the one or more images of the ROI.

In some embodiments, the plasma TAC of the object may be determined using a PET blood pool scan technique. Using the PET blood pool scan technique, the plasma TAC of the object may be determined based on the one or more images of the ROI. For example, the processing device 120 may determine a target region (e.g., a region associated with the heart or arterial blood) from each of the one or more images in the image sequence. The processing device 120 may identify a blood TAC from the one or more images based on the determined ROI and designate the blood TAC as the plasma TAC. The plasma TAC identified from the image sequence may be also referred to as an image-derived input function. More descriptions regarding the determination of the plasma input function may be found in FIG. 7 and the descriptions thereof.

In some embodiments, the plasma TAC of the object may be determined using a machine learning technique. For example, the processing device 120 may obtain a trained machine learning model (i.e., a trained plasma input function determination model). The processing device 120 may input the image sequence into the trained machine learning model and determine the plasma TAC of the object. The trained machine learning model may be trained by the processing device 120 or another processing device different from the processing device 120 online or offline according to process 800 as described in FIG. 8.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted, and/or one or more additional operations may be added. For example, operation 510 and operation 520 may be combined into a single operation. As another example, one or more other optional operations (e.g., a storing operation) may be added elsewhere in the process 500. In the storing operation, the processing device 120 may store information and/or data (e.g., the image data of the object, the one or more ROIs, the trained ROI determination model, the target portion of the image data, the one or more images, the plasma input function, etc.) associated with the medical system 100 in a storage device (e.g., the storage device 130) disclosed elsewhere in the present disclosure.

Figure 6:
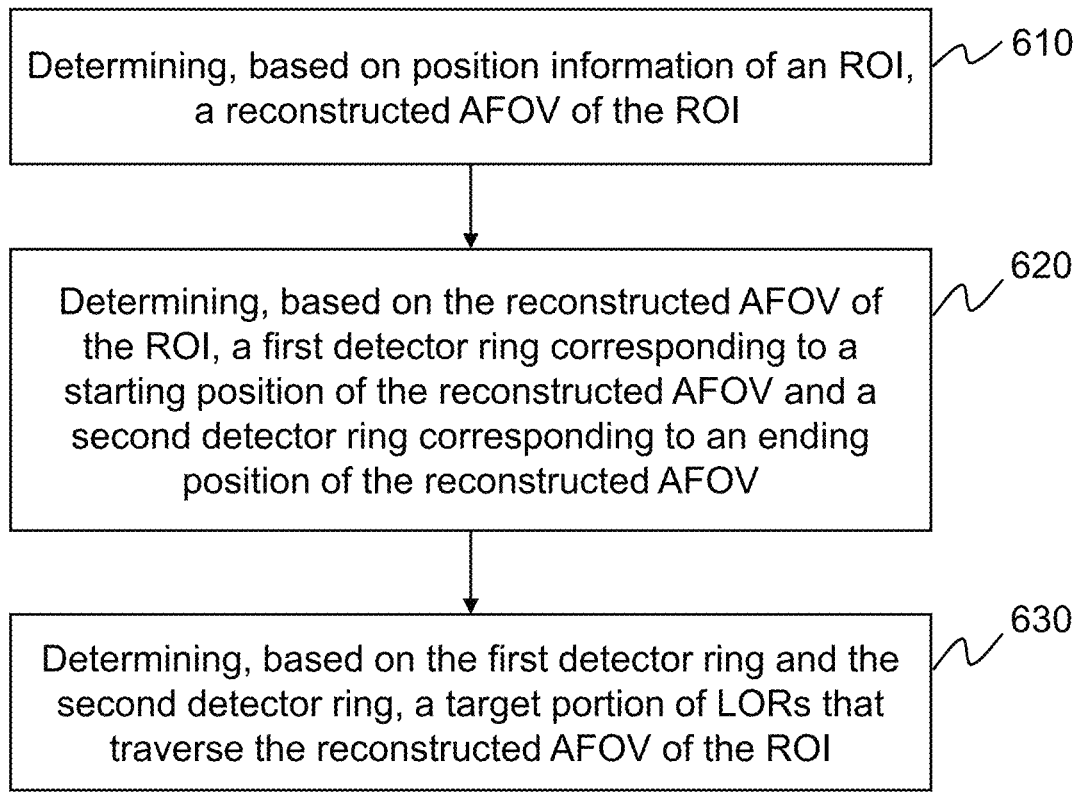
FIG. 6 is a schematic flowchart illustrating an exemplary process for determining a target portion of LORs according to some embodiments of the present disclosure.

FIG. 6 is a schematic flowchart illustrating an exemplary process for determining a target portion of LORs according to some embodiments of the present disclosure. In some embodiments, process 600 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the processor 210, and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, the second image described in connection with operation 530 in FIG. 5 may be obtained according to the process 600.

In 610, the processing device 120 (e.g., the determination module 420) may determine, based on position information of an ROI, a reconstructed axial field of view (AFOV) of the ROI.

In some embodiments, the position information of the ROI refers to a position of the axial range of the ROI in a scanning region of an imaging device (i.e., the first imaging device, e.g., a PET device). In some embodiments, the first imaging device (e.g., the medical device 110) may include a plurality of detector rings arranged along an axial direction of the imaging device. The plurality of detector rings may form the scanning region of the first image device (i.e., full AFOV). Each of the plurality of detector rings may include detecting units arranged along a radial direction of the first imaging device. More descriptions regarding the plurality of detector rings may be found in FIGS. 9A-9B and the descriptions thereof.

The position of the axial range of the ROI may be determined based on a reference image (e.g., the first reference image as described in FIG. 5) acquired by a second image device (e.g., a CT device) that is same as or different from the first image device. For example, the position of the axial range of the ROI may including a starting position and an ending position along the axial direction. The starting position and the ending position of the ROI along the axial direction may be denoted by coordinates using a coordinate system of the first imaging device. The coordinates of the starting position and the ending position of the ROI in the coordinate system of the first imaging device may be determined based on coordinates of the starting position and the ending position of the ROI in a coordinate system of the second imaging device. For example, the processing device 120 may convert coordinates of the starting position and the ending position of the ROI in the coordinate system of the second imaging device into the coordinates in the coordinate system of the first imaging device based on a transformation relationship between the first imaging device and the second imaging device. The coordinates of the starting position and the ending position of the ROI in the coordinate system of the second imaging device may be determined based on position information of the ROI in the reference image.

The reconstructed AFOV of the ROI may refer to a portion of a full AFOV of an imaging device (e.g., the medical device 110) that corresponds to the ROI. The reconstructed AFOV of an ROI may also be referred to as a sub-AFOV. In some embodiments, the reconstructed AFOV of the ROI may be a space defined by an axial range of the ROI in the axial direction. For example, the reconstructed AFOV of the ROI may be a space between two detecting rings aligning to the starting position and the ending position of the axial range of the ROI, respectively in a vertical direction. In some embodiments, the reconstructed AFOV of the ROI may include or cover the space defined by the axial range of the ROI in the axial direction. For example, the reconstructed AFOV of the ROI may include a space between two detecting rings that are respectively located beside the two detecting units aligning to the starting position and the ending position of the axial range of the ROI, respectively in the vertical direction.

In 620, the processing device 120 (e.g., the determination module 420) may determine, based on the reconstructed AFOV of the ROI, a first detector ring corresponding to a starting position of the reconstructed AFOV and a second detector ring corresponding to an ending position of the reconstructed AFOV.

In some embodiments, the starting position of the reconstructed AFOV may be the same as the starting position of the axial range of the ROI and the ending position of the reconstructed AFOV may be the same as the ending position of the axial range of the ROI. The first detector ring corresponding to the starting position of the reconstructed AFOV and the second detector ring corresponding to the ending position of the reconstructed AFOV may be determined based on the reconstructed AFOV of the ROI.

In some embodiments, the determination of the first detector ring and the second detector ring may include determining positions of the first detector ring and the second detector ring among the plurality of detector rings. In some embodiments, the plurality of detector rings may be distinguished by numbering the plurality of detector rings with a serial number in sequence along the axial direction. The positions of the first detector ring and the second detector ring among the plurality of detector rings may be determined by determining the serial numbers of the first detector ring and the second detector ring. The reconstructed AFOV may be formed by detector rings with serial numbers in a range between a serial number of the first detector ring and a serial number of the second detector ring.

In some embodiments, a width of a detector ring may be the same. The full AFOV of the imaging device may be determined based on the plurality of the detector rings. For example, the full AFOV of the imaging device may be determined based on a total count (number) of the plurality of detector rings and the width of each of the plurality of detector rings. In some embodiments, the serial number of the first detector ring may be determined based on the starting position and the width of the detector ring and the second serial number of the second detector ring may be determined based on the ending position and the width of the detector ring. For example, the serial number of the detector ring may be determined based on Equation (2):

$$n=[s/p], \quad (2)$$

where n refers to the serial number of a detector ring, s refers to a distance between the detector ring and a reference detector ring (e.g., a detector ring with serial number 1), and p refers to the width of each detector ring. The square brackets [ ] in Equation (2) refers to rounding up to an integer. For example, if s of a first detector ring is 29 millimeters and p is 2.85 millimeters, a corresponding result s/p is 10.18. The serial number of the first detector ring (e.g., n) may be 10. If sofa second detector ring is 80 millimeters and p is 2.85 millimeters, a corresponding result s/p is 28.07. The serial number of the second detector ring (e.g., n) may be 29.

In 630, the processing device 120 (e.g., the determination module 420) may determine, based on the first detector ring and the second detector ring, target LORs that traverse the reconstructed AFOV of the ROI.

Since image data obtained by the imaging device (e.g., the medical device 110) relates to multiple lines of response (LORs) each of which associated with two detector units that are located two sides of the axial direction, the processing device 120 may determine the target LORs among the multiple LORs and determine the target portion of the image data corresponding to the ROI based on the target LORs. For example, the target portion of the image data may include a statistic associated with coincidence events recoded by a pair of detecting units along each of the target LORs.

In some embodiments, the processing device 120 may determine the target LORs that traverse the reconstructed AFOV of the ROI based on the serial numbers of the first detector ring and the second detector rings. For example, each of the multiple LORs may correspond to two detecting units on the LOR that are located in one or two detecting rings with serial numbers ×1 (also referred to as a third serial number) and ×2 (also referred to as a fourth serial number). And ×1 may be less than or equal to ×2. An LOR corresponding to detecting rings with serial numbers ×1 and ×2 satisfying a condition may traverse the reconstructed AFOV of the ROI. The condition may include that the serial numbers ×1 and ×2 are in the range of the serial numbers of the first detector ring and the second detector ring (also referred to as a first serial number and a second serial number) (the serial number of the first detector ring exceeding the serial number of the second detector ring) may traverse the reconstructed AFOV of the ROI. In other words, an LOR corresponding to detecting rings with serial numbers ×1 and ×2 that exceeds or equals the serial number of the first detector ring and is less than or equal to the serial number of the second detector ring may traverse the reconstructed AFOV of the ROI. As used herein, an LOR corresponding to detecting rings with serial numbers that are in the range of the serial numbers of the first detector ring and the second detector ring corresponding to a reconstructed AFOV may also refer to an LOR that is within the reconstructed AFOV.

In some embodiments, the condition may include that an LOR corresponding to detecting rings with serial number ×1 that is less than the serial number of the first detector ring and serial number ×2 that exceeds the serial number of the first detector ring may traverse the reconstructed AFOV of the ROI. In some embodiments, the condition may include that an LOR corresponding to detecting rings with serial number ×1 that is less than the serial number of the second detector ring and serial number ×2 that exceeds the serial number of the second detector ring may traverse the reconstructed AFOV of the ROI.

For example, the serial numbers of the first detector ring and the second detector ring are 11 and 29, respectively, LORs corresponding to detecting rings with serial numbers within a range from 11 to 29, may be determined as the target portion of the image data corresponding to the ROI; LORs corresponding to detecting rings with a serial number less than 11 and a serial number exceeding 11 may be determined as the target portion of the image data corresponding to the ROI; and LORs corresponding to detecting rings with a serial number less than 29 and a serial number exceeding 29 may be determined as the target portion of the image data corresponding to the ROI.

For example, as shown in FIG. 10, lines 1020, 1022, 1024, 1026, 1028, and 1030 traverse AFOV1, AFOV2, and AFOV3, respectively. Line 1032 does not traverse the AFOVs.

In some embodiments, if an attenuation correction is performed in an image reconstruction, the processing device 120 may determine, based on the first detector ring and the second detector ring, the target LORs that each of the LORs connects detecting units in detector rings that are arranged between the first detector ring and the second detector ring. In other words, the target LORs may be within the reconstructed AFOV, for example, lines 1020, 1024, and 1030 in FIG. 10.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted, and/or one or more additional operations may be added. For example, operation 620 and operation 630 may be combined into a single operation. As another example, one or more other optional operations (e.g., a storing operation) may be added elsewhere in the process 600. In the storing operation, the processing device 120 may store information and/or data (e.g., the position information, the target LORs, the first detector ring, the second detector ring, etc.) associated with the imaging system 100 in a storage device (e.g., the storage device 130) disclosed elsewhere in the present disclosure.

Figure 7:
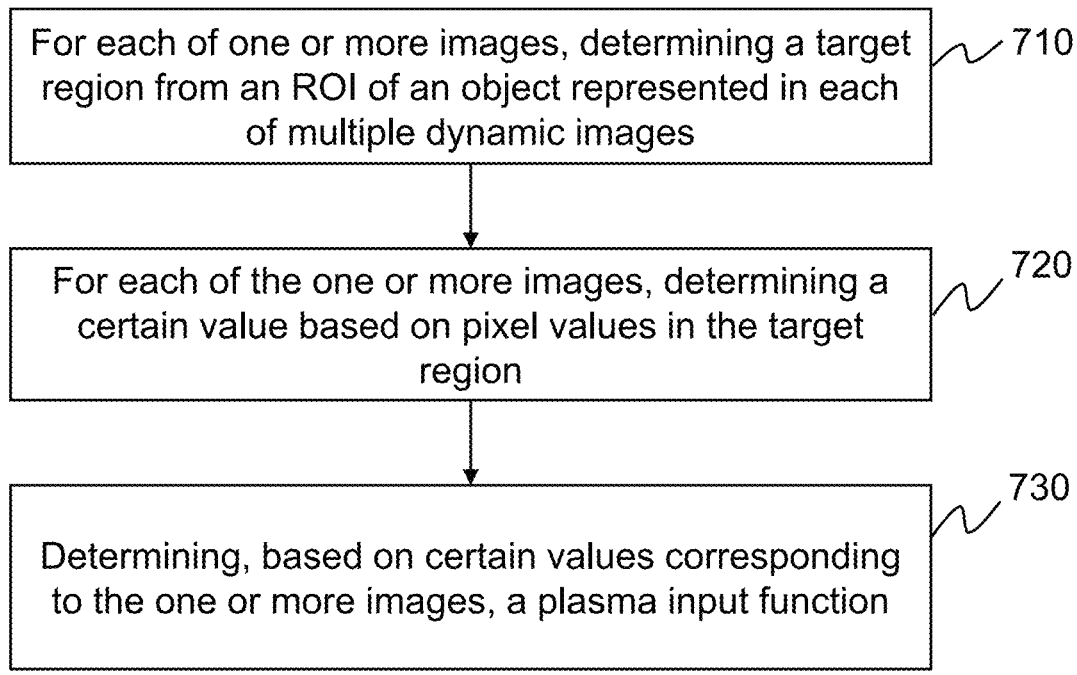
FIG. 7 is a schematic flowchart illustrating an exemplary training process for determining a plasma input function according to some embodiments of the present disclosure.

FIG. 7 is a schematic flowchart illustrating an exemplary process for determining a plasma input function according to some embodiments of the present disclosure. In some embodiments, process 700 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the processor 210, and/or the CPU 340 may be configured to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, operation 550 in FIG. 5 may be performed according to the process 700.

In 710, for each of multiple dynamic images, the processing device 120 (e.g., the determination module 420) may determine a target region from an ROI of an object represented in each of the multiple dynamic images. The multiple dynamic images may be also referred to as dynamic activity images of the ROI, which may present a dynamic change of uptake of a tracer (or radioactive tracer) in the ROI with time. The multiple images may be also referred to as an image sequence. A dynamic image in the image sequence may be a standardized uptake value (SUV) image with voxels or pixels presenting SUV associated with other ROIs. An SUV associated with the ROI may represent an uptake of a tracer (or radioactive tracer) of the ROI in the object (e.g., a tumor) that is normalized by an injected dose of the tracer and a body mass (or body surface area) of the object.

In some embodiments, the multiple dynamic images in the image sequence may be reconstructed independently using scanning data (e.g., raw data) acquired during each of the one or more consecutive time periods. A specific dynamic image of the ROI corresponding to a specific time period may be reconstructed based on scanning data acquired during a specific time period using an image reconstruction algorithm as described elsewhere in the present disclosure.

In some embodiments, a specific dynamic image of the ROI corresponding to a specific time period may be reconstructed according to at least a portion (operations 510-540) of process 500 as described in FIG. 5.

In some embodiments, the ROI may include at least a portion of the aorta and the heart. The target region determined from the image of the ROI may represent a blood pool. The blood pool may be associated with the blood in the aorta and the heart. In some embodiments, the object may include the head and the neck, and the ROI may include the muscular artery (e.g., intracranial or extracranial segment) and at least a portion of the brain. The blood pool may be associated with the blood in the muscular artery.

In some embodiments, the processing device 120 may determine the target region in each of the dynamic images based on a reference image representing the ROI. In some embodiments, the reference image may represent anatomic structures of the ROI. In some embodiments, the reference image may represent molecular information such as function and metabolism of the ROI. The reference image may include a CT image, an MRI image, a PET image, an X-ray image, an infrared scanning image, or the like, or any combination thereof. In some embodiments, the reference image may be the same as the reference image (i.e., the second reference image) in operation 540. In some embodiments, the reference image may be different from the second reference image in operation 540.

In some embodiments, the processing device 120 may determine the target region in a dynamic image by determining the target region represented in the reference image and matching the reference image with the dynamic image to determine the target region in the dynamic image. In some embodiments, the target region represented in the reference image may be determined using a trained machine learning model (i.e., a trained target region determination model). For example, the processing device 120 may retrieve the trained target region determination model from a storage device (e.g., the storage device 130, the terminals(s) 140, or any other storage device). The trained target region determination model may be determined by training a machine learning model offline based on a plurality of training samples using the processing device 120 or a processing device other than the processing device 120. The trained target region determination model may be stored in the storage device 130, the terminals(s) 140, or any other storage device. For instance, the processing device 120 may retrieve the trained target region determination model from the storage device 130, the terminals(s) 140, or any other storage device in response to receipt of a request for determining the target region. In some embodiments, the processing device 120 may input the reference image of the ROI into the trained target region determination model. An output result may be generated by the trained target region determination model. The output result of the trained target region determination model may include the target region represented in each of the one or more reference images. After determining the target region represented in each of the one or more reference images, the processing device 120 may match the reference image with one of the multiple dynamic images to determine the target region represented in the dynamic image.

In some embodiments, each of the multiple dynamic images representing the ROI may include information, such as, an activity value of a concentration of a radioactive tracer in the blood pool that is denoted by values of pixels/voxels in the dynamic image, etc. The activity value of the concentration of the radioactive tracer in the dynamic image may reflect physiological properties, anatomical properties, and/or biochemical properties of the target region in the ROI. The activity value of the concentration of the radioactive tracer in the dynamic image may also be referred to as a standardized uptake value (SUV). In some embodiments, the processing device 120 may determine the reference image from the multiple dynamic images based on the information. For example, the processing device 120 may determine the reference image from the multiple dynamic images, where the activity value of the concentration of the radioactive tracer in the reference image exceeds a threshold. The threshold may relate to a reference standardized uptake value (SUV). The SUV associated with an ROI in a dynamic image may be denoted by gray values of pixels in the ROI. For example, the SUV for each of different portions of the ROI may be denoted as gray values of pixels in the portion of the ROI. The activity value of the concentration of the radioactive tracer in the reference image exceeding the threshold may refer to that a maximum SUV, a minimum SUV, or a mean SUV, etc., in the reference image exceeds the threshold. In some embodiments, the threshold may be set as 50%, 60%, 70%, 80%, 90%, 100%, etc. of the reference SUV. In some embodiments, the processing device 120 may further match the reference image with one of the one or more images to determine the target region represented in the image.

In 720, for each of the multiple dynamic images, the processing device 120 (e.g., the determination module 420) may determine a certain value based on pixel values in the target region.

The certain value may include a mean value, a max value, a middle value, etc., of the pixel values in the target region. For example, the mean value may be determined via a mean operation on the pixel values in the target region. The mean operation may include an arithmetic mean, a geometric mean, a square mean (RMS), a harmonic mean, a weighted mean, or the like, or any combination thereof.

In 730, the processing device 120 (e.g., the determination module 420) may determine, based on certain values each of which corresponds to one of the multiple dynamic images, the plasma input function.

The plasma input function may be also referred to as a plasma time activity curve (TAC). The plasma input function associated with the blood vessel may describe the change of the concentration of radioactivity of the tracer (i.e., radioactivity activity or concentration) in the plasma with time. In some embodiments, the processing device 120 may determine the plasma input function by determining a time-tracer concentration (i.e., the activity value of the concentration of the radioactive tracer) curve based on the certain values. The processing device 120 may further designate the time-tracer concentration curve as the plasma input function. In some embodiments, the processing device 120 may determine the plasma input function using a fitting technique. Exemplary fitting techniques may include using a line regression model, a gradient boost decision tree (GBDT) model, a support vector machine (SVM) model, a naive Bayesian model, an extreme gradient boosting (XG-BOOST) model, a causal model, or the like, or any combination thereof. For example, each of the multiple dynamic images may correspond to a time duration. The processing device 120 may determine a time point corresponding to the time duration (e.g., a starting time of the time duration, an ending time of the time duration, a middle time of the time duration, etc.). The processing device 120 may the plasma input function by fitting multiple groups of data, each of which includes a time point and a mean value corresponding to a dynamic image using a fitting technique.

In some embodiments, the plasma input function may be used to determine parametric images and used for kinetic analysis. The parametric images may be indicative of some physiological parameters (also referred to as dynamic parameters) of tracer kinetics, which can aid the evaluation of the physiology (functionality) and/or anatomy (structure) of the target organ or tissue, as well as its biochemical properties. In a dynamic image, each voxel or pixel may present a value of a dynamic parameter (also referred to as physiological parameter) of tracer kinetics, while the image in the image sequence presents radioactivity concentrations. Exemplary dynamic parameters may include a perfusion rate of a tracer, a receptor binding potential of the tracer, a distribution of the tracer in the plasma, a distribution of the tracer in the sample, a transport rate of the tracer from the plasma to a tissue (i.e., K1), a transport rate of the tracer from a tissue to the plasma (i.e., K2), or the like, or any combination thereof.

In some embodiments, the dynamic images may be reconstructed using a parametric imaging technique based on the scanning data (e.g., raw data) of the ROI and/or the image sequence and the plasma input function. For example, the processing device 120 may determine the parametric images using a trained machine learning model for dynamic imaging. The trained machine learning model for dynamic imaging may be trained by the processing device 120 or another processing device that is same as or different from the processing device 120 online or offline based on training data. The processing device 120 may input the image sequence and the plasma input function into the trained machine learning model for dynamic imaging and the dynamic images may be output by the trained machine learning model for dynamic imaging.

In some embodiments, using the parametric imaging technique, the parametric image may be reconstructed based on the scanning data of the ROI and the plasma input function that is also referred to as arterial input function (AIF). The AIF may describe the change of the concentration of radioactivity of the tracer (i.e., radioactivity activity or concentration) in the arterial blood with time. For example, the AIF may be denoted as a function of time-concentration curve of a contrast agent (e.g., the tracer) in the arterial blood of a certain tissue. According to the definition, the AIF should be extracted from each pixel of a volume image (i.e., the image as described in operation 710), that is, AIF should be extracted from each pixel associated with the capillaries supplying blood. Based on this, the AIF should be determined based on a small artery. However, it is difficult to measure the signal intensity in smaller arteries due to the partial volume effect of surrounding tissues, otherwise the partial volume effect will have a serious adverse effect on the correct measurement of the AIF. In order to reduce the effect of partial volume effect on the AIF, the AIF should be measured in larger arteries. Therefore, in the present embodiment, the ROI may be determined as the aortic region and the cardiac region, which may decrease the effectiveness of the partial volume effect of surrounding tissues, thereby improving the accuracy of AIF extraction, and further improving the accuracy of dynamic imaging. In addition, using the plasma input function may be determined from the dynamic images of the ROI and the dynamic images of the ROI may be reconstructed based on scanning data of the ROI, which improves the speed of dynamic images reconstruction and saves the computing resources, thereby improving the speed for determining the plasma input function. The ROI may also be referred to as the region needed to extract the plasma input function (also referred to as parametric imaging input function).

It should be noted that when reconstructing other parts of the scanned object (e.g., the brain), whether it is direct parametric imaging or indirect parametric reconstruction (image-based parametric imaging), there is no need for dynamic images of other parts of the body, so only the FOV of the chest position may be needed for dynamic reconstruction of PET images. In addition, because the time activity curve (TAC), i.e., the plasma input function extracted from the dynamic images of the aorta (thoracic position, ascending aorta, aortic arch, descending aorta) is not necessary, but also may be extracted from the muscular artery (intracranial or extracranial segment), so the brain parametric imaging may be performed based on the dynamic images of the head and neck.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted, and/or one or more additional operations may be added. For example, operation 720 and operation 730 may be combined into a single operation. As another example, one or more other optional operations (e.g., a storing operation) may be added elsewhere in the process 700. In the storing operation, the processing device 120 may store information and/or data (e.g., the target region, the threshold, the certain value, the reference image, etc.) associated with the imaging system 100 in a storage device (e.g., the storage device 130) disclosed elsewhere in the present disclosure.

Figure 8:
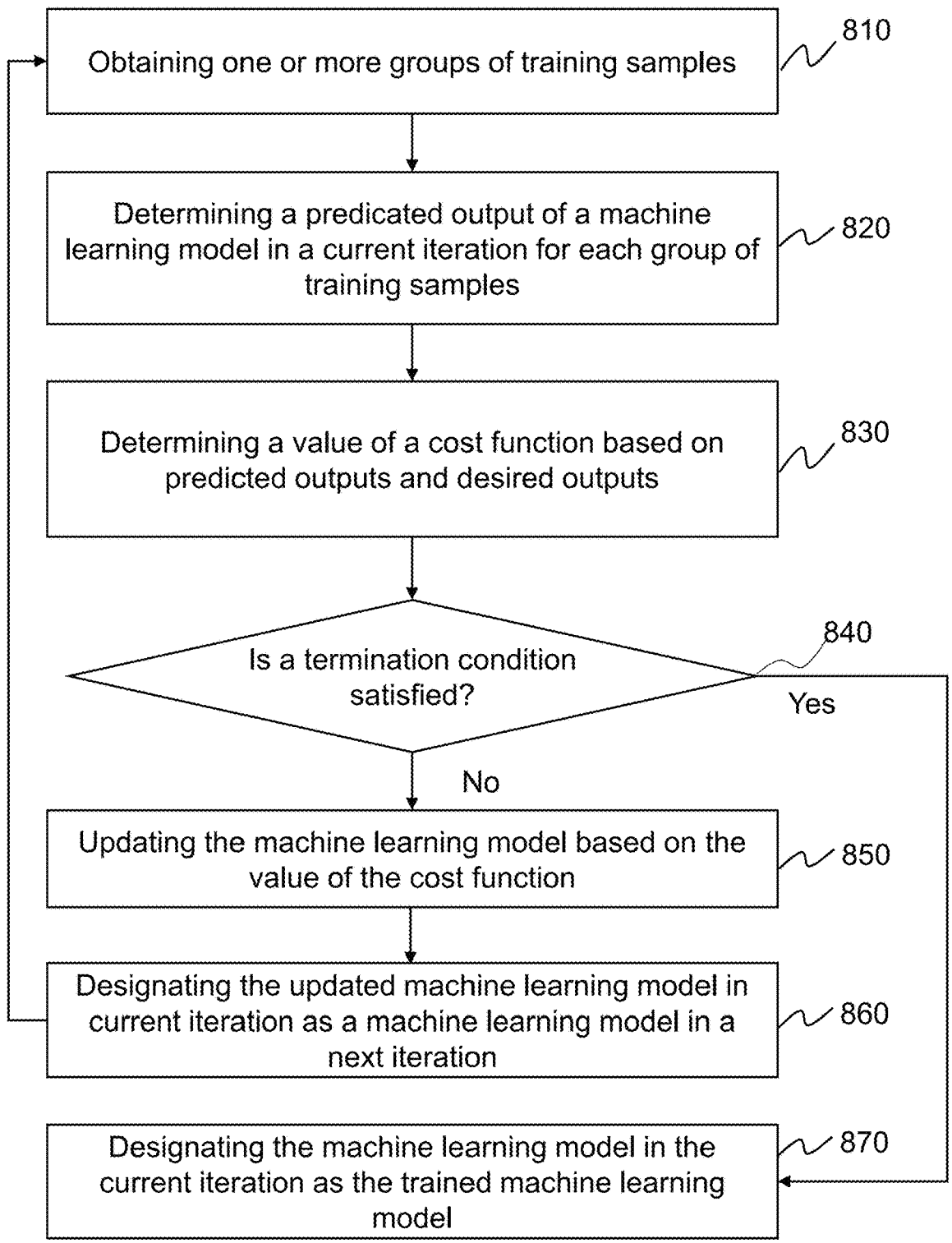
FIG. 8 is an exemplary training process of a trained machine learning model according to some embodiments of the present disclosure.

FIG. 8 is a schematic flowchart illustrating an exemplary training process of a trained machine learning model according to some embodiments of the present disclosure. In some embodiments, process 800 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the processor 210, and/or the CPU 340 may be configured to perform the process 700. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting. In some embodiments, a first training process of the trained ROI determination model as described in connection with operations 520 in FIG. 5, a second training process of a trained plasma input function determination model as described in connection with operations 550 in FIG. 5, and/or a third training process of the trained target portion determination model as described in connection with operations 710 in FIG. 7, respectively, may be performed according to the process 800.

The trained machine learning model may be generated by training a machine learning model. In some embodiments, the machine learning model to be trained may include a convolutional neural network (CNN) model, a recurrent neural network (RNN) model, a long short term memory (LS™) network model, a fully convolutional neural network (FCN) model, a generative adversarial network (GAN) model, a back propagation (BP) machine learning model, a radial basis function (RBF) machine learning model, a deep belief nets (DBN) machine learning model, an Elman machine learning model, or the like, or any combination thereof. The machine learning model may include a plurality of parameters, such as architecture parameters, learning parameters, etc. Exemplary architecture parameters of the machine learning model may include the size of a kernel of a layer, the total count (or number) of layers, the count (or number) of nodes in each layer, a learning rate, a batch size, an epoch, etc. Exemplary learning parameters may include a connected weight between two connected nodes, a bias vector relating to a node, etc.). Before the training, the machine learning model may have one or more initial parameter values. In the training of the machine learning model, learning parameters of the machine learning model may be updated. The updating of the learning parameters of the machine learning model may be also referred to as the updating the machine learning model. In some embodiments, the training process of the machine learning model may be an iterative including one or more iterations. For illustration purposes, a current iteration of the iteration(s) is described in the following description. The current iteration may include one or more operations of the process 800.

In 810, the processing device 120 (e.g., the obtaining module 450) may obtain multiple groups of training samples. Each group of the multiple groups of training samples may include one or more input images of a machine learning model and a desired output of the machine learning model in the process of training the machine learning model. The desired output of the machine learning model may be also referred to as a training label.

In some embodiments, if the machine learning model is trained to obtain the trained ROI determination model as described in operation 520, the multiple groups of training samples may be also referred to as multiple groups of first training samples. Each group of the multiple groups of first training samples may correspond to a sample object. In some embodiments, the sample object corresponding to one or more of the multiple groups of first training samples may be an object as described elsewhere in the present disclosure (e.g., FIGS. 1 and 5, and the descriptions thereof). Each group of first training samples may include a training scout image of a sample object and a reference image (also referred to as a third reference image) corresponding to the training scout image of the sample object. The training scout image may include a PET image, an MR image, a CT image, an X-ray image, an infrared scanning image, or the like, or any combination thereof. The third reference image corresponding to the training scout image may be the training scout image labeled with the one or more identified ROIs. In the training process, the training scout image in each group of first training samples may serve as the input image of the machine learning model and the third reference image corresponding to the training scout image may serve as a desired output of the machine learning model, i.e., the training label.

In some embodiments, if the machine learning model is trained to obtain the trained machine learning model for determining a plasma inputted function as described in operation 550, the multiple groups of training samples may be also referred to as the multiple groups of second training samples. Each group of the multiple groups of second training samples may correspond to an ROI. The ROI corresponding to one or more of the multiple groups of second training samples may be an ROI as described elsewhere in the present disclosure (e.g., FIGS. 5 and 7, and the descriptions thereof). Each group of second training samples may include a group of dynamic images arranged in time sequence and a reference plasma inputted function. The reference plasma inputted function may correspond to the group of dynamic images. In the training process, the group of dynamic images arranged in times sequence may serve as the input image of the machine learning model, and the reference plasma inputted function may serve as a desired output of the machine learning model.

In some embodiments, if the machine learning model is trained to obtain the trained target portion determination model as described in operation 730, the multiple groups of training samples may be also referred to as the multiple groups of third training samples as described in FIG. 7. Each group of the multiple groups of third training samples may correspond to an ROI. In some embodiments, the ROI corresponding to one or more of the multiple groups of training samples may be an ROI as described elsewhere in the present disclosure (e.g., FIGS. 5 and 7, and the descriptions thereof). Each group of third training samples may include a training image of a training ROI and a reference image (also referred to as a fourth reference image) corresponding to a target portion of the training ROI. The training image of the training ROI may include a PET image, an MR image, a CT image, an X-ray image, an infrared scanning image, or the like, or any combination thereof of the training ROI. The fourth reference image may be the training image labeled with the corresponding target portion. In the training process, the training image of the training ROI in each group of third training samples may serve as the input image of the machine learning model and the fourth reference image may serve as a desired output of the machine learning model, i.e., the training label.

In 820, the processing device 120 (e.g., the model training module 460) may determine a predicated output of a machine learning model in a current iteration for each group of training samples. The machine learning model in the current iteration may process the input images in each group of training samples (e.g., a training scout image and a third reference image, a group of dynamic images arranged in times sequence and a reference plasma inputted function, or a training image and a fourth reference image). The machine learning model may extract one or more image features (e.g., a low-level feature (e.g., an edge feature, a texture feature), a high-level feature (e.g., a semantic feature), or a complicated feature (e.g., a deep hierarchical feature) included in the inputted image(s) (e.g., a first specific image, or a second specific image and a particular image). Based on the extracted image features, the machine learning model may determine the predicted output (e.g., a first predicted image generated based on the training scout image, a predicted plasma inputted function generated based on the group of dynamic images arranged in times sequence, or a second predicted image generated based on the training image) corresponding to the inputted image(s).

In 830, the processing device 120 (e.g., the model training module 460) may determine a value of a cost function based on predicted outputs and desired outputs. As used herein, a cost function (or loss function) may refer to a function that measures a difference between the predicted output of the machine learning model and the desired output (i.e., an actual output), wherein the difference may indicate the accuracy of the machine learning model. The cost function may include a log loss function, a cross-entropy loss function, a least-squares function, an index loss function, etc.

In 840, the processing device 120 (e.g., the model training module 460) may determine whether a termination condition is satisfied. The termination condition may provide an indication of whether the machine learning model is sufficiently trained. The termination condition may relate to a cost function or an iteration count of the training process. For example, the processing device 120 may determine a loss function of the machine learning model and determine a value of the cost function based on the difference between the estimated image and the actual image. Further, the processing device 120 may determine the termination condition is satisfied if the value of the loss function is less than a threshold. The threshold may be default settings of the medical system 100 or may be adjustable under different situations. As another example, the termination condition may be satisfied if the value of the cost function converges. The convergence may be deemed to have occurred if the variation of the values of the cost function in two or more consecutive iterations is smaller than a threshold (e.g., a constant). As still another example, the processing device 120 may determine the termination condition is satisfied if a specified number (or count) of iterations are performed in the training process.

In response to a determination that the termination condition is satisfied, the processing device 120 may proceed to operation 870. In 870, the processing device 120 may designate the machine learning model in the current iteration as the trained machine learning model (e.g., the ROI determination model, the plasma input function determination model, or the target portion determination model). On the other hand, in response to a determination that the termination condition is not satisfied, the processing device 120 may proceed to operation 850. In 850, the processing device 120 may update the machine learning model based on the value of the cost function. For example, the processing device 120 may update the value(s) of the learning parameter(s) of the machine learning model based on the value of the loss function according to, for example, a backpropagation algorithm.

In 860, the processing device 120 (e.g., the model training module 460) may designate the updated machine learning model in the current iteration as a machine learning model in a next iteration.

After 860, the processing device 120 may proceed to operation 810 to perform the next iteration until the termination condition is satisfied. In the next iteration, the processing device 120 may obtain multiple groups of training samples in another batch. The size of the batch may refer to a group count or number of the multiple groups of training samples. After the termination condition is satisfied in a certain iteration, the machine learning model in the certain iteration having the updated value(s) of the learning parameter(s) may be designated as the trained machine learning model (e.g., the ROI determination model, the plasma input function determination model, or the target portion determination model).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 810, the processing device 120 may also preprocess the training image. As another example, one or more other optional operations (e.g., a storing operation) may be added elsewhere in the process 800. In the storing operation, the processing device 120 may store information and/or data (e.g., the multiple groups of training samples, the trained machine learning model, etc.) associated with the medical system 100 in a storage device (e.g., the storage device 130) disclosed elsewhere in the present disclosure. It should be noted that the ROI determination model, the plasma input function determination model, or the target portion determination model may be constructed based on machine learning models in the same type or different types. The ROI determination model, the plasma input function determination model, or the target portion determination model may be trained using the same or different training algorithms.

Figure 9A:
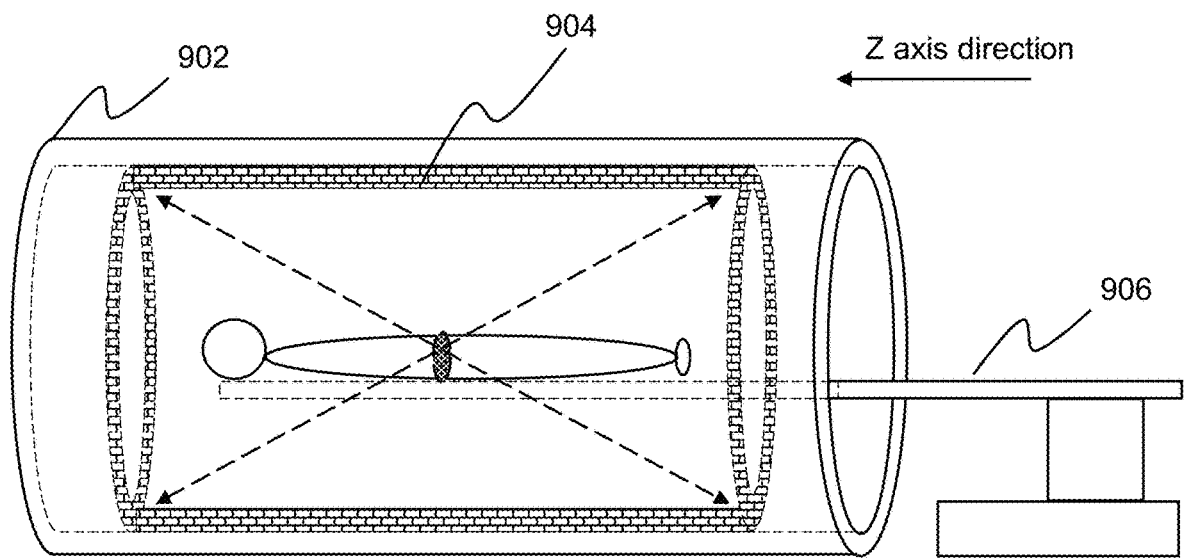
FIG. 9A is a schematic diagram illustrating an exemplary medical device according to some embodiments of the present disclosure.

FIG. 9A is a schematic diagram illustrating an exemplary medical device 110 according to some embodiments of the present disclosure. As shown in FIG. 9A, the medical device 110 may include a supporting assembly 902, a detector assembly 904, and a table 906. The supporting assembly 902 may be configured to support other components in the medical device 110 including, for example, the detector assembly 904, a cooling assembly (not shown in FIG. 9A), etc. For example, the supporting assembly 902 may be configured to support the detector assembly 904 and/or drive the detector assembly 904 to move, such as rotate, translate, swing, etc. In some embodiments, the supporting assembly 902 may include a bore. The bore may have a first transverse diameter (or referred to as a bore transverse diameter) and a first axial length (or referred to as a bore axial length). The bore axial length may be defined as the distance from one end of the bore to an opposite end of the bore along a z-axis direction (i.e., the axial direction) indicated by the arrow as shown in FIG. 9A. In some embodiments, the bore axial length may also refer to a length of the supporting assembly 902 along the z-axis direction. In some embodiments, the bore axial length of the supporting assembly 902 may be in a range from 0.75 meters to 2 meters. In some embodiments, the bore axial length of the supporting assembly 902 may exceed 2 meters.

The detector assembly 904 may include a plurality of detector rings arranged along the axial direction of the imaging device, and each of the plurality of detector rings may include multiple detecting units arranged along a radial direction of the medical device 110. That is, the detector units may be arranged on an inner wall of the supporting assembly 902 in a certain number of detector rings. In some embodiments, the detector assembly 904 may have a second transverse diameter (or referred to as the transverse diameter of the detector assembly) and a second axial length (or referred to as the axial length of the detector assembly). The axial length of the detector assembly may be defined as a distance from one end of the detector assembly 904 to an opposite end of the detector assembly 904 along the z-axis direction. The axial length of the detector assembly may also refer to the length of the detector assembly 904 in the z-axis direction. The transverse diameter of the detector assembly 904 may be defined as a diameter of a detector ring on the transverse plane perpendicular to the z-axis direction.

In some embodiments, the axial length of the detector assembly may relate to an axial field of view (AFOV) of the medical device 110. As used herein, the AFOV may refer to a maximum length along the z-axis direction of the detector assembly 904 to detect a coincidence event effectively. The greater the axial length of the detector assembly 904 is, the larger the AFOV of the medical device 110 may be. For instance, the axial length of the detector assembly 904 may be in a range from 0.75 meters to 2 meters. In some embodiments, the axial length of the detector assembly 904 may exceed 0.75 meters, or 1 meter, or 1.5 meters, or 2 meters. Correspondingly, the axial length of the AFOV may exceed 0.75 meters, or 1 meter, or 1.5 meters, or 2 meters. Multiple organs (e.g., a head, a heart, a lung, a liver, a stomach, a pancreas, a bladder, a knee, etc.) of an object may be scanned in a single scan. As another example, the axial length of the detector assembly 904 may be in a range from 0.75 meters to 1.25 meters. The region between the head and the thigh of an object (e.g., an adult patient) may be scanned in a single scan, or a whole-body scan may be achieved in a single scan of an object of a small size (e.g., a child). As a further example, the axial length of the detector assembly 904 may be in the range from 1.25 meters to 2 meters or exceed 2 meters. In some embodiments, the bore axial length of the supporting assembly 902 may be equal to or greater than the axial length of the detector assembly 904.

The transverse diameter of the detector assembly 904 may relate to a transverse field of view (FOV) of the medical device 110. The transverse FOV may relate to an angle of acceptance for a scintillator of the detector assembly 904 to detect a coincidence event on the transverse plane. The greater the transverse diameter of the detector assembly 904 is, the larger the transverse FOV of the medical device 110 may be. The transverse diameter of the detector assembly 904 may be smaller than the bore transverse diameter.

In some embodiments, the plurality of detector rings may be numbered with a serial number along the Z axial direction. For example, the plurality of detector rings may be numbered with 1, 2, . . . , N in sequence along the Z axial direction.

Each of detecting units in a detector ring may be used to receive radiation rays (e.g., γ rays) generated from a patient's body indirectly by tracer molecules and to provide information relating to the locations of the tracer molecules, which in turn provides functional information of the patient. The detector units may generate electrical signals based on the radiation rays, and then the electrical signals may be detected and used to reconstruct an image.

A detecting unit may include a crystal element (e.g., a scintillator crystal) and a photosensor. A detector ring including multiple detecting units may be also referred to as a crystal ring. A crystal element (e.g., a scintillator) may scintillate when a radiation ray (e.g., γ ray) photon impinges on the crystal element. The crystal element may absorb the energy of the radiation ray (e.g., γ ray) photon, and convert the absorbed energy into light. The crystal element may use one or more types of crystals including, for example, NaI(TI), BGO, LSO, YSO, GSO, LYSO, LaBr$_3$, LFS, LuAP, LuI$_3$, BaF$_2$, CeF, CsI(TI), CsI(Na), CaF$_2$(Eu), CdWO$_4$, YAP, or the like, or any combination thereof.

A photosensor may convert a light signal (e.g., the light output from a scintillator) to an electrical signal. In some embodiments, a photosensor may be a photomultiplier tube (PMT), a silicon photomultiplier (SiPM), etc. In some embodiments, a photosensor (e.g., PMT, or SiPM) may be a single-channel photosensor or a multi-channel photosensor.

Figure 9B:
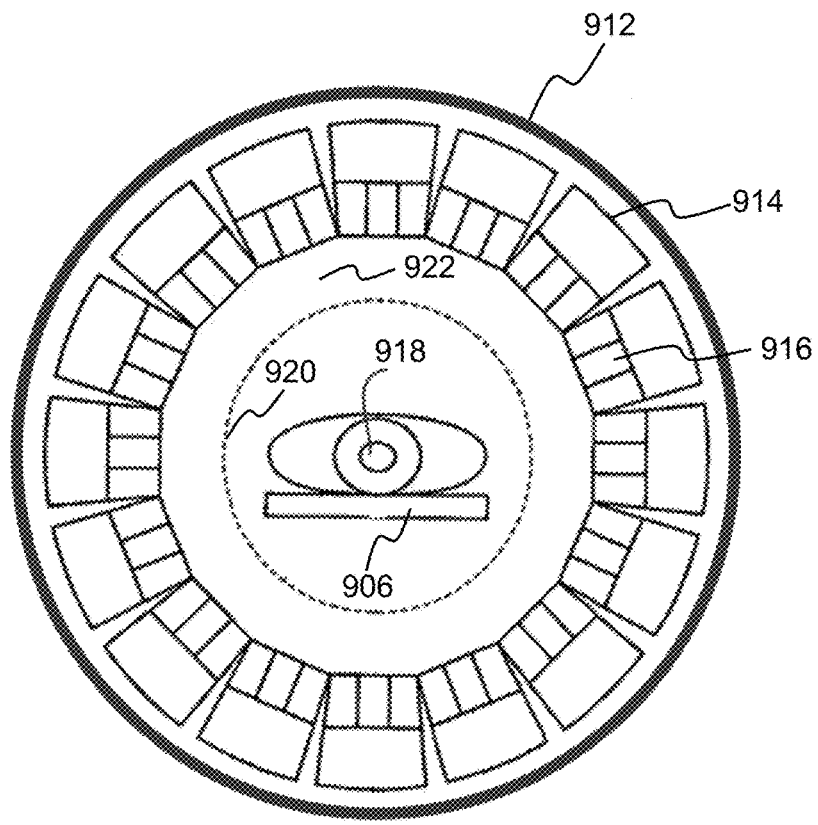
FIG. 9B is a schematic diagram illustrating a side view of an exemplary medical device according to some embodiments of the present disclosure.

FIG. 9B is a schematic diagram illustrating a side view of an exemplary medical device 110. As illustrated in FIG. 9, a plurality of detector cassettes 914 may be arranged in substantially a ring configuration in the transverse plane. A detector cassette 914 may include one or more detector units 916. The detector cassettes 914 may be covered and protected by a shell 912. In some embodiments, a shell 912 may be a hollow cylinder. The region encircled by the detector cassettes 914 may be a detection region 922. The detection region 922 may accommodate an object 918 to be scanned. The object 918 may be supported by a table 906. In some embodiments, if the object 918 is positioned within the range of a transverse FOV, radiation rays emitted from the object 918 may be detected by the detector cassettes 914.

FIG. 10 is a schematic diagram illustrating image data corresponding to an ROI according to some embodiments of the present disclosure.

As shown in FIG. 10, an imaging device includes multiple detector rings 1002. Regions 1008, 1012, and 1016 are axial fields of view (AFOV) of multiple ROIs. Each of the multiple ROIs may correspond to an AFOV. Lines 1020, 1022, 1024, 1026, 1028, 1030, and 1032 are lines of response (LOR). The lines 1020, 1024, and 1030 are the LORs within the AFOVs 1008, 1012, and 1016, respectively. The lines 1020 and 1022 are LORs that traverse AFOV 1008. The lines 1024 and 1026 are LORs that traverse AFOV 1012. The lines 1028 and 1030 are LORs that traverse AFOV 1016. The line 1022 is not within the AFOV 1008, but traverse the AFOV 1008. The line 1026 is not within the AFOV 1012, but traverse the AFOV 1012. The line 1028 is not within the AFOV 1016, but traverse the AFOV 1016. The line 1032 is neither within the AFOVs, nor traverse the AFOVs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
    at least one storage device storing executable instructions, and
    at least one processor in communication with the at least one storage device, when executing the executable instructions, causing the system to perform operations including:
        determining, based on each region of interest (ROI) of one or more ROIs of an object, a target portion of image data of the object corresponding to the ROI, wherein the image data of the object relates to multiple lines of response (LORs), and the target portion of the image data corresponding to the ROI relates to target LORs among the multiple LORs that traverse a reconstructed axial field of view (AFOV) of the ROI; and generating, based on the target portion of the image data, one or more images of the ROI.

2. A system, comprising:

at least one storage device storing executable instructions, and at least one processor in communication with the at least one storage device, when executing the executable instructions, causing the system to perform operations including:

determining, based on each region of interest (ROI) of one or more ROIs of an object, a target portion of image data of the object corresponding to the ROI, including:

determining, based on a reconstructed axial field of view (AFOV) of the ROI, a detector ring range corresponding to the reconstructed AFOV; and determining, based on the detector ring range, the target portion of the image data corresponding to the ROI; and generating, based on the target portion of the image data, one or more images of the ROI.

3. The system of claim 2, wherein the image data is acquired by an imaging device, the imaging device includes a plurality of detector rings arranged along an axial direction of the imaging device, each of the plurality of detector rings includes detecting units arranged along a radial direction of the imaging device, the image data relates to multiple lines of response (LORs), each of which associated with two detector units that are located two sides of the axial direction; and the target portion of the image data corresponding to the ROI relates to target LORS among the multiple LORs that traverse the reconstructed AFOV of the ROI.

4. The system of claim 3, wherein the determining, based on a reconstructed axial field of view (AFOV) of the ROI, a detector ring range corresponding to the reconstructed AFOV includes:

determining, based on position information of the ROI, the reconstructed AFOV of the ROI;

determining, based on the reconstructed AFOV of the ROI, a first detector ring corresponding to a starting position of the reconstructed AFOV and a second detector ring corresponding to an ending position of the reconstructed AFOV; and determining, based on the first detector ring and the second detector ring, the detector ring range corresponding to the reconstructed AFOV.

5. The system of claim 4, wherein each of the LORs connects detecting units in detector rings that are arranged between the first detector ring and the second detector ring.

6. The system of claim 5, wherein the generating, based on the target portion of the image data, one or more images of the ROI further includes:

obtaining reference image data of the ROI;

reconstructing, based on the reference image data, one or more reference images;

generating one or more attenuation images based on the one or more reference images; and performing an attenuation correction on the target portion of the image data based on the one or more attenuation images.

7. The system of claim 4, wherein each of the plurality of detector rings is identified with a serial number, the determining, based on the reconstructed AFOV of the ROI, a first detector ring corresponding to a starting position of the reconstructed AFOV and a second detector ring corresponding to an ending position of the reconstructed AFOV includes:

determining, based on the starting position and a width of a detector ring, a first serial number of the first detector ring; and determining, based on the ending position and the width of the detector ring, a second serial number of the second detector ring.

8. The system of claim 7, wherein each of the LORs connects detecting units in detector rings with a third serial number and a fourth serial number, and the third serial number and the fourth serial number satisfy a condition including that:

the third serial number and the fourth serial number are in a range from the first serial number to the second serial number, or the third serial number is less than the first serial number and the fourth serial number exceeds the first serial number, or the third serial number is less than the second serial number and the fourth serial number exceeds the second serial number.

9. The system of claim 2, wherein the one or more images include one or more dynamic images of the ROI, and the operations further including:

determining, based on the one or more dynamic images of the ROI, a plasma input function.

10. A system, comprising:

at least one storage device storing executable instructions, and at least one processor in communication with the at least one storage device, when executing the executable instructions, causing the system to perform operations including:

determining, based on each region of interest (ROI) of one or more ROIs of an object, a target portion of image data of the object corresponding to the ROI;

generating, based on the target portion of the image data, one or more images of the ROI, the one or more images including one or more dynamic images of the ROI; and determining, based on the one or more dynamic images of the ROI, a plasma input function.

11. The system of claim 10, wherein the image data is acquired by an imaging device, the imaging device includes a plurality of detector rings arranged along an axial direction of the imaging device, each of the plurality of detector rings includes detecting units arranged along a radial direction of the imaging device, the image data relates to multiple lines of response (LORs), each of which associated with two detector units that are located two sides of the axial direction; and the target portion of the image data corresponding to the ROI relates to target LORS among the multiple LORs that traverse a reconstructed axial field of view (AFOV) of the ROI.

12. The system of claim 11, wherein the determining, based on each region of interest (ROI) of one or more ROIs, a target portion of image data corresponding to the ROI among the image data includes:

determining, based on position information of the ROI, the reconstructed AFOV of the ROI;

determining, based on the reconstructed AFOV of the ROI, a first detector ring corresponding to a starting position of the reconstructed AFOV and a second detector ring corresponding to an ending position of the reconstructed AFOV; and determining, based on the first detector ring and the second detector ring, the target LORS that traverse the reconstructed AFOV of the ROI.

13. The system of claim 12, wherein each of the LORs connects detecting units in detector rings that are arranged between the first detector ring and the second detector ring.

14. The system of claim 13, wherein the generating, based on the target portion of the image data, one or more images of the ROI further includes:

obtaining reference image data of the ROI;

reconstructing, based on the reference image data, one or more reference images;

generating one or more attenuation images based on the one or more reference images; and performing an attenuation correction on the target portion of the image data based on the one or more attenuation images.

15. The system of claim 12, wherein each of the plurality of detector rings is identified with a serial number, the determining, based on the reconstructed AFOV of the ROI, a first detector ring corresponding to a starting position of the reconstructed AFOV and a second detector ring corresponding to an ending position of the reconstructed AFOV includes:

determining, based on the starting position and a width of a detector ring, a first serial number of the first detector ring; and determining, based on the ending position and the width of the detector ring, a second serial number of the second detector ring.

16. The system of claim 15, wherein each of the LORs connects detecting units in detector rings with a third serial number and a fourth serial number, and the third serial number and the fourth serial number satisfy a condition including that:

the third serial number and the fourth serial number are in a range from the first serial number to the second serial number, or the third serial number is less than the first serial number and the fourth serial number exceeds the first serial number, or the third serial number is less than the second serial number and the fourth serial number exceeds the second serial number.

17. The system of claim 10, wherein the determining, based on the one or more dynamic images of the ROI, a plasma input function includes:

for each of the one or more dynamic images,
determining a target region from the ROI represented in the dynamic image, the target region representing a blood pool;
determining a certain value based on pixel values in the target region; and determining, based on certain values corresponding to the one or more dynamic images, the plasma input function.

18. The system of claim 17, wherein the determining a target region from the ROI represented in the dynamic image further includes:

obtaining one or more reference images representing the ROI;

determining the target region represented in each of the one or more reference images; and matching each of the one or more reference images with one of the one or more dynamic images to determine the target region represented in the image.

19. The system of claim 17, wherein the determining a target region from the ROI represented in the dynamic image further includes:

determining a reference image from the one or more dynamic images, an activity value of a concentration of a radioactive tracer in the blood pool representing in the reference image exceeding a threshold; and matching the reference image with one of the one or more dynamic images to determine the target region represented in the dynamic image.

20. The system of claim 10, wherein the ROI includes at least one of an aortic region or a heart.

* * * * *